United States Patent
Javadiabhari

(10) Patent No.: US 12,020,117 B2
(45) Date of Patent: Jun. 25, 2024

(54) ENHANCED QUANTUM CIRCUIT OPERATION VIA A UNIVERSALLY IMPLEMENTABLE 4X4 UNITARY MATRIX DECOMPOSITION

(71) Applicant: International Business Machines Corporation, Armonk, NY (US)

(72) Inventor: Ali Javadiabhari, Sleepy Hollow, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 478 days.

(21) Appl. No.: 17/400,677

(22) Filed: Aug. 12, 2021

(65) Prior Publication Data
US 2023/0051437 A1 Feb. 16, 2023

(51) Int. Cl.
 G06F 30/30 (2020.01)
 G06F 15/16 (2006.01)
 G06N 10/00 (2022.01)

(52) U.S. Cl.
 CPC ............. *G06N 10/00* (2019.01); *G06F 15/16* (2013.01)

(58) Field of Classification Search
 CPC ........ G06N 10/00; G06N 10/80; G06N 10/20; G06F 15/16
 See application file for complete search history.

(56) References Cited

U.S. PATENT DOCUMENTS 10,056,908 B2 8/2018 Rigetti et al.
11,042,685 B2 * 6/2021 Martiel ................ G06F 30/367
(Continued)

FOREIGN PATENT DOCUMENTS

WO 2015042660 A1 4/2015
WO 2020180297 A1 9/2020

OTHER PUBLICATIONS

Vatan et al., "Optimal Quantum Circuits for General Two-Qubit Gates," arXiv.quant-ph/0308006v3, Mar. 25, 2004, 6 pages.
(Continued)

*Primary Examiner* — Jack Chiang
*Assistant Examiner* — Brandon Bowers
(74) *Attorney, Agent, or Firm* — Amin, Turocy & Watson, LLP

(57) ABSTRACT

Systems, computer-implemented methods and/or computer program products are provided to facilitate operation of a quantum circuit on a set of qubits via providing and implementing decompositions of one or more unitary matrices. According to an embodiment, a system can implement a unitary matrix by providing and implementing a decomposition of the unitary matrix, to thereby facilitate operation of and/or operate a quantum circuit on a set of qubits. The system can comprise a memory that stores computer executable components and a processor that executes the computer executable components stored in the memory. The computer executable components can comprise a unitary matrix management component that decomposes a defined 4×4 unitary matrix into a defined circuit comprising a sequence of universal gates. The sequence of universal gates can be a same sequence for each defined 4×4 unitary matrix of a set of candidate 4×4 unitary matrices including the defined 4×4 unitary matrix.

20 Claims, 14 Drawing Sheets

(56) References Cited

U.S. PATENT DOCUMENTS

| | | | | |
|---|---|---|---|---|
| 2006/0123363 | A1* | 6/2006 | Williams | G06N 10/00 977/839 |
| 2018/0096257 | A1 | 4/2018 | Lucarelli | |
| 2019/0205783 | A1 | 7/2019 | Nam et al. | |
| 2021/0099201 | A1* | 4/2021 | Winick | H04B 3/32 |
| 2022/0374751 | A1* | 11/2022 | Huang | G06N 10/80 |

OTHER PUBLICATIONS

Zhang et al., "Conditions for optimal construction of two-qubit non-local gates," arXiv:quant-ph/0411058v1, Nov. 9, 2004, 6 pages.

Cross et al., "Validating quantum computers using randomized model circuits," arXiv:1811.12926v2 [quant-ph], Oct. 11, 2019, 12 pages.

Shende et al., "Finding Small Two-Qubit Circuits," Proceedings vol. 5436, Quantum Information and Computation II; (2004), 12 pages.

Pino et al., "Demonstration of the QCCD trapped-ion quantum computer architecture," arXiv:2003.01293, 2020, 8 pages.

D'Anjou et al., "Enhancing qubit readout through dissipative sub-Poissonian dynamics," Phys. Rev. A 96, 052321—Published Nov. 15, 2017, 8 pages.

Mell et al., "The NIST Definition of Cloud Computing," Recommendations of the National Institute of Standards and Technology, NIST Special Publication 800-145, Sep. 2011, 7 pages.

"IBM Ilog Ampl,". V12. 1: User's manual for cplex. International Business Machines Corporation, 46(53):157, Jun. 2009, 102 pages.

Karalekas et al., "A quantum-classical cloud platform optimized for variational hybrid algorithms," arXiv:2001.04449v3 [quant-ph] May 31, 2020, 21 pages.

Sundaresan et al., "Reducing unitary and spectator errors in cross resonance with optimized rotary echoes," arXiv:2007.02925v1 [quant-ph] Jul. 6, 2020, 22 pages.

Yirka, "Honeywell claims to have built the highest-performing quantum computer available," https://phys.org/news/2020-06-honeywell-built-highest-performing-quantum.html, Jun. 22, 2020, 2 pages.

"Open-Source Quantum Development," https://qiskit.org/, accessed Jul. 14, 2021, 5 pages.

McKay et al, Qiskit Backend Specifications for OpenQASM and OpenPulse Experiments, arXiv:1809.03452v1 [quant-ph] Sep. 10, 2018, 68 pages.

Mallet et al., "Single-shot qubit readout in circuit quantum electrodynamics," Nature Physics, vol. 5, Sep. 27, 2009, 5 pages.

Chamberland et al., "Topological and Subsystem Codes on Low-Degree Graphs with Flag Qubits, " Physical Review X 10, 011022 (2020), 19 pages.

"IBM Quantum," https://quantum-computing.ibm.com/, accessed Jul. 16, 2021, 2 pages.

Gambetta et al., "Characterization of addressability by simultaneous randomized benchmarking," Physical Review Letters, Dec. 2012, 11 pages.

Motzoi et al., "Simple pulses for elimination of leakage in weakly nonlinear qubits," arXiv:0901.0534v3 [cond-mat.mes-hall], Oct. 22, 2009, 4 pages.

Paraoanu et al., "Microwave-induced coupling of superconducting qubits," Phys. Rev. B 74, 140504(R)—Published Oct. 31, 2006, 4 pages.

Rigetti et al., "Fully microwave-tunable universal gates in superconducting qubits with linear couplings and fixed transition frequencies," Phys. Rev. B 81, 134507—Published Apr. 5, 2010, 7 pages.

Chow et al., "Simple All-Microwave Entangling Gate for Fixed-Frequency Superconducting Qubits," Phys. Rev. Lett. 107, 080502—Published Aug. 17, 2011, 5 pages.

Li et al., "Tackling the Qubit Mapping Problem for NISQ-Era Quantum Devices," arXiv:1809.02573v2 [cs.ET] May 7, 2019, 13 pages.

Sheldon et al., "Procedure for systematically tuning up cross-talk in the cross-resonance gate," Phys. Rev. A 93, 060302(R)—Published Jun. 24, 2016, 5 pages.

McKay et al., "Universal Gate for Fixed-Frequency Qubits via a Tunable Bus," Phys. Rev. Applied 6, 064007—Published Dec. 12, 2016, 10 pages.

Shende et al., "Minimal universal two-qubit controlled-NOT-based circuits," Phys. Rev. A 69, 062321—Published Jun. 30, 2004, 8 pages.

Maslov, "Basic circuit compilation techniques for an ion-trap quantum machine," New J. Phys. 19 023035, 2017, 16 pages.

Murali et al., "Full-stack, real-system quantum computer studies: architectural comparisons and design insights," 2019 ACM/IEEE 46th Annual International Symposium on Computer Architecture (ISCA), IEEE, 2019, 14 pages.

Arute et al., "Quantum Approximate Optimization of Non-Planar Graph Problems on a Planar Superconducting Processor," arXiv:2004.04197v1 [quant-ph] Apr. 8, 2020, 17 pages.

Viola et al., "Dynamical Decoupling of Open Quantum Systems," Phys. Rev. Lett. 82, 2417—Published Mar. 22, 1999, 5 pages.

Souza et al., "Robust dynamical decoupling," Phil. Trans. R. Soc. A (2012) 370, 22 pages.

Suter et al., "Colloquium: Protecting quantum information against environmental noise," Reviews of Modern Physics, vol. 88, Oct.-Dec. 2016, 23 pages.

Hahn, "Spin Echoes," Phys. Rev. 80, 580—Published Nov. 15, 1950, 23 pages.

Carr et al., "Effects of Diffusion on Free Precession in Nuclear Magnetic Resonance Experiments," Phys. Rev. 94, 630—Published May 1, 1954, 13 pages.

Meiboom et al., "Modified Spin-Echo Method for Measuring Nuclear Relaxation Times," Review of Scientific Instruments 29, 688 (1958), 5 pages.

Maudsley, "Modified Carr-Purcell-Meiboom-Gill sequence for NMR fourier imaging applications," Journal of Magnetic Resonance, vol. 69, Issue 3, Oct. 1, 1986, 4 pages.

Khodjasteh et al., "Fault-Tolerant Quantum Dynamical Decoupling," Phys. Rev. Lett. 95, 180501—Published Oct. 26, 2005, 4 pages.

Khodjasteh et al., "Performance of deterministic dynamical decoupling schemes: Concatenated and periodic pulse sequences," Phys. Rev. A 75, 062310—Published Jun. 8, 2007, 16 pages.

Uhrig, "Keeping a Quantum Bit Alive by Optimized $\pi$-Pulse Sequences," Phys. Rev. Lett. 98, 100504—Published Mar. 9, 2007, 4 pages.

Uhrig, "Concatenated Control Sequences Based on Optimized Dynamic Decoupling," Phys. Rev. Lett. 102, 120502—Published Mar. 27, 2009, 4 pages.

Souza et al., "Robust Dynamical Decoupling for Quantum Computing and Quantum Memory," Phys. Rev. Lett. 106, 240501—Published Jun. 14, 2011, 4 pages.

Quiroz et al., "Quadratic dynamical decoupling with nonuniform error suppression," Phys. Rev. A 84, 042328—Published Oct. 17, 2011, 17 pages.

Pokharel et al., "Demonstration of Fidelity Improvement Using Dynamical Decoupling with Superconducting Qubits," Phys. Rev. Lett. 121, 220502—Published Nov. 29, 2018, 6 pages.

Divincenzo, "The physical implementation of quantum computation," Fortschritte der Physik, 48(9-11):771-783, 2000, 13 pages.

Knill et al., "Randomized benchmarking of quantum gates," Phys. Rev. A 77, 012307—Published Jan. 8, 2008, 7 pages.

Magesan et al., "Scalable and Robust Randomized Benchmarking of Quantum Processes," Phys. Rev. Lett. 106, 180504—Published May 6, 2011, 4 pages.

Merkel et al., "Self-consistent quantum process tomography," Phys. Rev. A 87, 062119—Published Jun. 24, 2013, 9 pages.

Blume-Kohout et al., "Robust, self-consistent, closed-form tomography of quantum logic gates on a trapped ion qubit," arXiv:1310.4492v1 [quant-ph] Oct. 16, 2013, 12 pages.

Magnard et al., "Fast and Unconditional All-Microwave Reset of a Superconducting Qubit," Phys. Rev. Lett. 121, 060502—Published Aug. 7, 2018, 6 pages.

(56) References Cited

OTHER PUBLICATIONS

Egger et al., "Pulsed Reset Protocol for Fixed-Frequency Superconducting Qubits," Phys. Rev. Applied 10, 044030—Published Oct. 10, 2018, 7 pages.
Gambetta et al., "Quantum trajectory approach to circuit QED: Quantum jumps and the Zeno effect," Phys. Rev. A 77, 012112—Published Jan. 25, 2008, 18 pages.
International Search Report and Written Opinion for International Application No. PCT/EP2022/072320 dated Nov. 15, 2022.
Jurcevic, et al., "Demonstration of quantum vol. 64 on a superconducting quantum computing system", Quantum Sci. Technol, Mar. 17, 2021 (Mar. 17, 2021), pp. 1-11, XP55977948, Retrieved from the Internet: URL: https://iopscience.iop.org/article/10.1088/2058-9565/abe519/pdf [retrieved on Nov. 4, 2022] sections 1 and 3 figure 4.
Ryan et al., "Tomography via correlation of noisy measurement records," Phys. Rev. A 91, 022118—Published Feb. 20, 2015, 7 pages.
Elder et al., "High-Fidelity Measurement of Qubits Encoded in Multilevel Superconducting Circuits," Phys. Rev. X 10, 011001—Published Jan. 2, 2020, 10 pages.
Peterer et al., "Coherence and Decay of Higher Energy Levels of a Superconducting Transmon Qubit," Phys. Rev. Lett. 114, 010501—Published Jan. 6, 2015, 5 pages.
Koch et al., "Charge-insensitive qubit design derived from the Cooper pair box," Phys. Rev. A 76, 042319—Published Oct. 12, 2007, 19 pages.

\* cited by examiner

13) RZ commutes through Z line of RZX (thus flips angle through ECR)
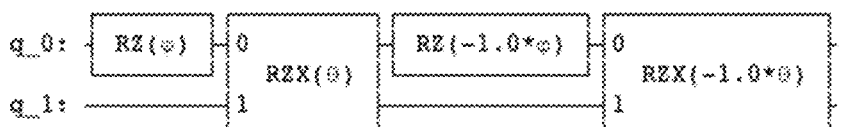
14) RX commutes through X line of RZX (thus ECR too)
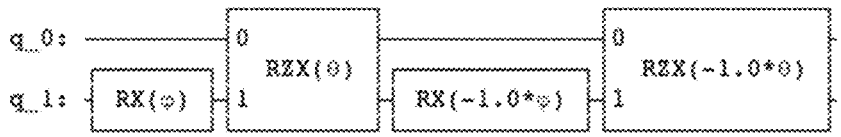
15) ECR is self-inverse
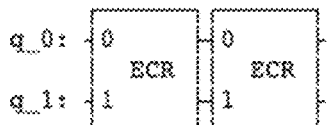
16) pre-rotation + ECR = CX
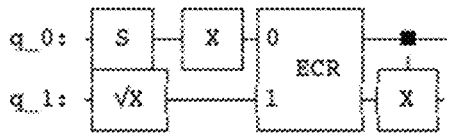
17) ECR + post-rotation = CX
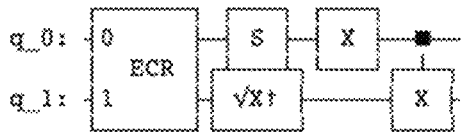
18) Z goes through ECR target, induces Y on same wire and Z on other wire
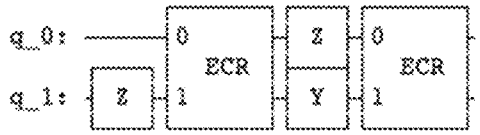
19) X goes through ECR target, induces Y on same wire and X on other wire
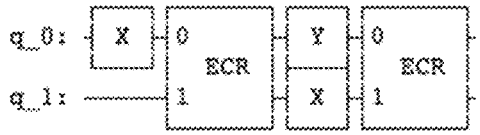
20) flipping ECR
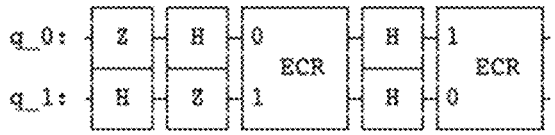
FIG. 6

ENHANCED QUANTUM CIRCUIT OPERATION VIA A UNIVERSALLY IMPLEMENTABLE 4X4 UNITARY MATRIX DECOMPOSITION

BACKGROUND

One or more embodiments described herein relate to quantum circuitry, and more specifically, to enhanced quantum circuit operation via a universally implementable decomposition of a 4×4 unitary matrix.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or computer program products are described that can facilitate operation of a quantum circuit on a set of qubits via providing and implementing a decomposition of a unitary matrix.

According to an embodiment, a system can comprise a memory that stores computer executable components and a processor that executes the computer executable components stored in the memory. The computer executable components can comprise a unitary matrix management component that decomposes a defined 4×4 unitary matrix into a defined circuit comprising a sequence of universal gates, where the sequence of universal gates is a same sequence for each defined 4×4 unitary matrix of a set of candidate 4×4 unitary matrices including the defined 4×4 unitary matrix.

According to another embodiment, a computer-implemented method can comprise decomposing, by a system operatively coupled to a processor, a defined 4×4 unitary matrix into a defined circuit comprising a sequence of universal gates, where the sequence of universal gates is a same sequence for each defined 4×4 unitary matrix of a set of candidate 4×4 unitary matrices including the defined 4×4 unitary matrix.

According to yet another embodiment, a computer program product for facilitating decomposition of a unitary matrix can comprise a computer readable storage medium having program instructions embodied therewith. The program instructions can be executable by a processor to decompose, by the processor, a defined 4×4 unitary matrix into a defined circuit comprising a sequence of universal gates, where the sequence of universal gates is a same sequence for each defined 4×4 unitary matrix of a set of candidate 4×4 unitary matrices including the defined 4×4 unitary matrix.

DESCRIPTION OF THE DRAWINGS

FIG. 6 illustrates a continuation of the set of candidate circuit identities of FIG. 5, in accordance with one or more embodiments described herein.

DETAILED DESCRIPTION

Figure 1:
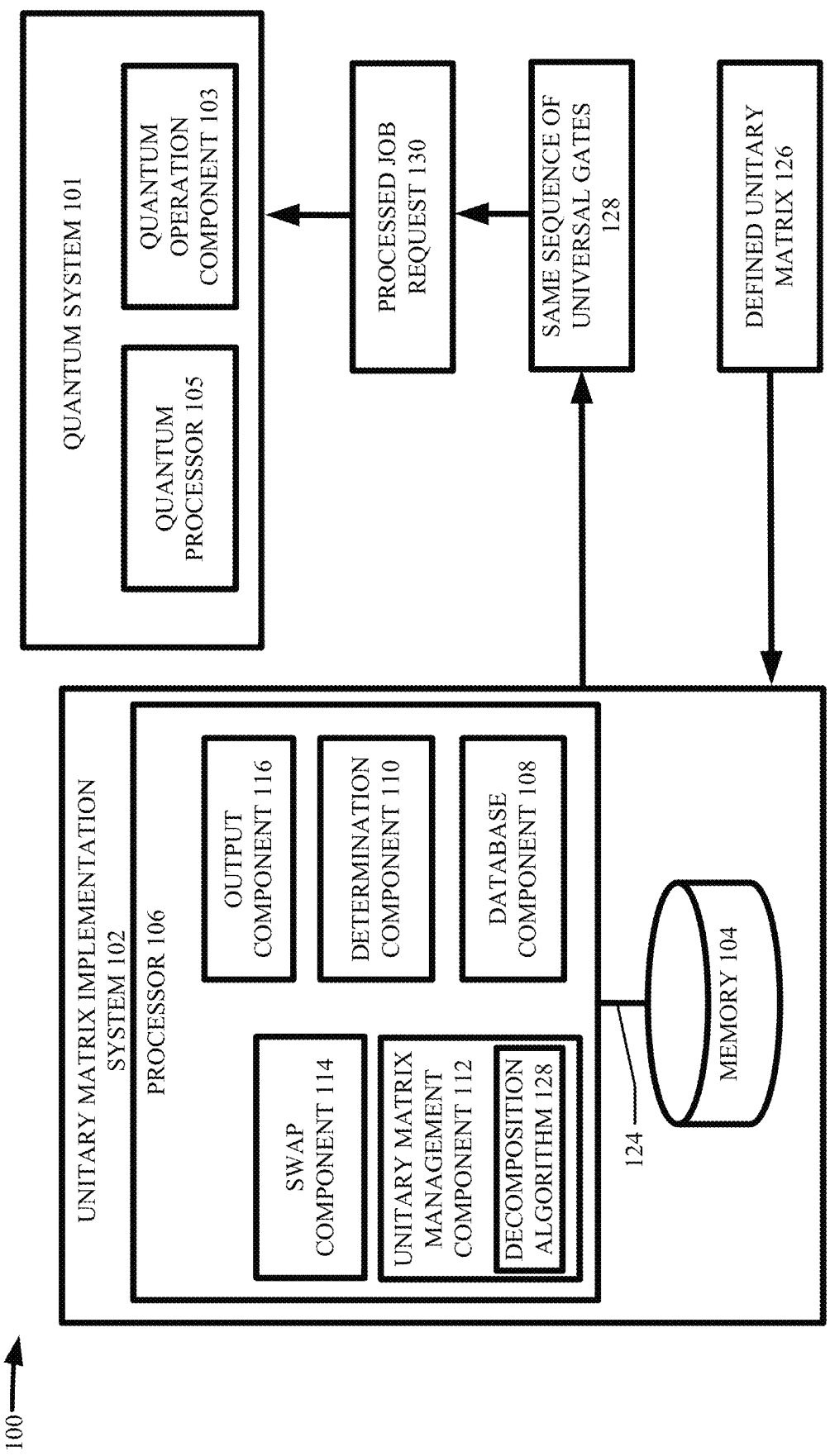
FIG. 1 illustrates a block diagram of an example, non-limiting system that can facilitate operation of a quantum circuit on a set of qubits via providing and implementing a decomposition of a unitary matrix, in accordance with one or more embodiments described herein.

The following detailed description is merely illustrative and is not intended to limit embodiments, application and/or uses of embodiments. Furthermore, there is no intention to be bound by any expressed and/or implied information presented in the preceding Background and/or Summary sections, and/or in this Detailed Description section.

Quantum circuits are transformations that operate on a set of qubits. Quantum circuits can be represented by one or more unitary matrices (e.g., unitary operators), i.e., surjective bounded operators on a Hilbert space that preserve the respective inner product and/or norm of the Hilbert space. Each unitary matrix can be a matrix (e.g., a quantum or unitary matrix) that can represent the quantum function and/or computations that can be performed by the unitary matrix. For example, a quantum circuit operating on n qubits for any suitable positive integer n can be represented by a $2^n \times 2^n$ unitary matrix. The quantum state of a set of qubits can be represented by a quantum state vector (e.g., for n qubits, a quantum state vector can have $2^n$ elements), and quantum circuits can be applied to a quantum state vector via matrix multiplication. Quantum circuits can be combined in series via matrix multiplication and/or can be combined in parallel via tensor products (e.g., Kronecker products). Quantum circuits, for instance as part of a quantum program, can operate one or more physical operations on a set of qubits, such as implementing a sequence of pulses. A pulse is a time-dependent tone that can be applied to a qubit to change its state. The fewer pulses utilized for operation of a quantum circuit, the less error that potentially can be introduced into the operation and/or the less time it can take for the operation to be completed, thus further reducing the potential for introduced error(s).

On a larger scale, quantum computing cloud service providers can execute millions of quantum jobs for users during a year. Each quantum job can include the execution of one or more quantum programs. The aforementioned quantity of quantum jobs can create pressure to execute the respective quantum programs quickly. Increased speed of execution can directly and/or indirectly correlate to maximizing system usage, minimizing compiling time to compile quantum programs, minimizing users having to wait for the compiling to be completed, and minimizing undesirable consuming of classical computational resources. Pressure also can be created to execute these quantum jobs well, so that a most performance can be extracted from near-term error-prone systems and/or so that the quality of compiling into physical-level pulses can be improved.

Accordingly, it can be desirable to improve the execution time for executing quantum jobs and/or quality of execution of the quantum jobs. The described subject matter can employ various techniques that can improve (e.g., enhance, optimize and/or reduce) the execution time for executing quantum program jobs and/or improve (e.g., enhance, optimize and/or increase) the quality of execution of such jobs.

To that end, the one or more embodiments described herein relate to techniques for enhancing quantum circuit execution in a quantum service, and in one or more cases, allowing for increased scaling of execution of quantum programs implementing the quantum circuits. A database component can compile one or more unitary matrices associated with quantum functions (e.g., quantum functions that can be performed by quantum circuits, quantum computations and/or quantum programs). A determination component can determine whether a quantum system executing the quantum service can implement one or more of a defined set of universal and native pulses. A unitary matrix management component, also herein referred to as a UMMC (e.g., a compiler), can decompose one or more of the compiled unitary matrices, and/or one or more non-compiled unitary matrices, for implementation on the quantum system, by employing one or more pulses of the defined set of universal and native pulses.

Where the defined unitary matrix (e.g., compiled or non-compiled) is, includes and/or can be decomposed into one or more 4×4 unitary matrices, the UMMC can decompose each one or more 4×4 unitary matrix, regardless of the parameters and/or degrees of freedom of the 4×4 unitary matrix, into a same sequence of universal gates, implementable as a same sequence of universal pulses. That is, these universal pulses each are of the defined set of universal pulses. The UMMC can determine (e.g., calculate) a total pulse count for implementation of each 4×4 unitary matrix, with each total pulse count being the same, as more fully described herein. Additionally and/or alternatively, the UMMC can determine (e.g., calculate) a total pulse count for operation of a larger quantum circuit (e.g., parent quantum circuit) from which the 4×4 unitary matrix was decomposed, also as more fully described herein.

One or more of the aforementioned embodiments are now described with reference to the figures, where like referenced numerals are used to refer to like elements throughout. In the following description, for purposes of explanation, numerous specific details are set forth in order to provide a more thorough understanding of the one or more embodiments. It is evident in one or more cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system 100 and/or the unitary matrix implementation system 102 illustrated at FIG. 1 can further comprise one or more computer and/or computing-based elements, such as described herein with reference to an operating environment 1200 illustrated at FIG. 12. In several described embodiments, computer and/or computing-based elements can be used in connection with implementing one or more of the systems, devices, components and/or computer-implemented operations shown and/or described in connection with FIG. 1 and/or with other figures described herein.

Turning first to FIG. 1, the figure illustrates a block diagram of an example, non-limiting system 100 that can decompose one or more 4×4 unitary matrices representing a quantum circuit into a same sequence of universal gates implementable as a same sequence of universal pulses. The decomposition can be employed to facilitate operation of the quantum circuit on a set of qubits, in accordance with one or more aspects and/or embodiments described herein. In one or more embodiments, the non-limiting system 100 can comprise a quantum system 101 (e.g., quantum computer system, superconducting quantum computer system and/or the like) that can employ quantum algorithms and/or quantum circuitry, including computing components and/or devices, to perform quantum operations and/or functions on input data to produce results that can be output to an entity, for example a machine, device, component, hardware, software and/or human. The quantum circuitry can comprise quantum bits (qubits), such as multi-bit qubits, physical circuit level components, high level components and/or functions. The quantum circuity can comprise physical pulses that can be structured (e.g., arranged and/or designed) to perform desired quantum functions and/or computations on data (e.g., input data and/or intermediate data derived from input data) to produce results as an output. The results can be responsive to the quantum job request and associated input data and can be based at least in part on the input data, quantum functions and/or quantum computations.

That is, the illustrated non-limiting system 100 can include both a quantum portion (e.g., the quantum system 101) and a classical portion (e.g., the unitary matrix implementation system 102). The non-limiting system 100 thus can be a hybrid system. In one or more other embodiments, the quantum system 101 can be separate from, but function in combination with, the non-limiting system 100 and/or the unitary matrix implementation system 102.

In one or more embodiments, the quantum system 101 can comprise one or more quantum components, such as a quantum processor 105 and a quantum operation component 103. The quantum operation component 103 can perform one or more quantum processes, calculations and/or measurements for operating one or more quantum circuits on one or more qubits. For example, the quantum operation component 103 can operate one or more qubit effectors, such as qubit oscillators, harmonic oscillators, pulse generators and/or the like to cause one or more pulses to stimulate and/or manipulate the state(s) of one or more qubits existing in the quantum system 101. The quantum processor 105 can direct operation of the quantum operation component 103 and/or provision of the one or more qubits at the quantum system 101.

The unitary matrix implementation system 102 can comprise any type of component, machine, device, facility, apparatus and/or instrument that comprises a processor and/or can be capable of effective and/or operative communication with a wired and/or wireless network. All such embodiments are envisioned. For example, unitary matrix implementation system 102 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device.

Generally, the unitary matrix implementation system 102 can implement a unitary matrix by providing and implementing a decomposition of the unitary matrix, to thereby facilitate operation of and/or operate a quantum circuit on a set of qubits. In one or more embodiments, the unitary matrix implementation system 102 can employ one or more of the following processes: decomposing a 4×4 unitary matrix into a defined circuit comprising a sequence of universal gates; providing the same resultant sequence of universal gates for each 4×4 unitary matrix of a set of all possible candidate 4×4 unitary matrices; and/or providing the sequence of universal gates being a universal same sequence of universal gates implementable on a majority of or all of quantum systems.

In one or more additional and/or alternative embodiments, the unitary matrix implementation system 102 can employ one or more of the additional and/or alternative following processes: providing the same sequence of universal gates comprising one or more square root of X gate, echo cross resonance gate, phase gate and/or a combination thereof; omitting other gate types form the same sequence of universal gates; providing the same sequence of universal gates comprising peripheral gates implementable via a larger quantity of physical operations at respective left and right peripheries of the sequence of universal gates, as compared to central gates disposed between the peripheral gates; and/or providing the same sequence of universal gates being compatible with native 2-qubit gate directions of hardware on which the same sequence of universal gates is to be implemented.

It will be appreciated that the following description(s) refer(s) to the operation of a single quantum circuit represented by a single decomposition of a single 4×4 unitary matrix. However, it also will be appreciated that one or more of the processes described herein can be scalable. For example, as will be appreciated below, the unitary matrix implementation system 102 can decompose one or more 4×4 unitary matrices subsequently and/or concurrently relative to one another. In one or more embodiments, a quantum circuit processed and/or operated by the unitary matrix implementation system 102 can have more than one circuit component, such as more than one unitary matrix. The more than one unitary matrix can be, include and/or be decomposed to more than one 4×4 unitary matrix.

Turning now to detailed explanations of various components illustrated at FIG. 1, functionality of the unitary matrix implementation system 102 will be described in detail.

In one or more embodiments, the unitary matrix implementation system 102 can comprise a processor 104 (e.g., computer processing unit, microprocessor, classical processor, quantum processor and/or like processor). In one or more embodiments, any component associated with unitary matrix implementation system 102, as described herein with or without reference to the one or more figures of the one or more embodiments, can comprise one or more computer and/or machine readable, writable and/or executable components and/or instructions that can be executed by processor 104 to facilitate performance of one or more processes defined by such component(s) and/or instruction(s).

In one or more embodiments, the unitary matrix implementation system 102 can comprise a computer-readable memory 106 that is operably connected to the processor 104. The memory 106 can store computer-executable instructions that, upon execution by the processor 104, can cause the processor 104 and/or other components of the unitary matrix implementation system 102 (e.g., determination component 110, UMMC 112, swap component 114 and/or output component 116) to perform one or more acts. In one or more embodiments, the memory 106 can store computer-executable components (e.g., determination component 110, UMMC 112, swap component 114 and/or output component 116).

Unitary matrix implementation system 102 and/or a component thereof as described herein can be communicatively, electrically, operatively, optically and/or otherwise coupled to one another via a bus 124 to perform functions of non-limiting system 100, unitary matrix implementation system 102 and/or any components thereof and/or coupled therewith. Bus 124 can comprise one or more of a memory bus, memory controller, peripheral bus, external bus, local bus, quantum bus and/or another type of bus that can employ one or more bus architectures. One or more of these examples of bus 124 can be employed to implement any one or more embodiments described herein.

In one or more embodiments, unitary matrix implementation system 102 can be coupled (e.g., communicatively, electrically, operatively, optically and/or like function) to one or more external systems, sources and/or devices (e.g., classical and/or quantum computing devices, communication devices and/or like devices), such as via a network. In one or more embodiments, one or more of the components of the non-limiting system 100 can reside in the cloud, and/or can reside locally in a local computing environment (e.g., at a desired location(s)).

In addition to the processor 104 and/or memory 106 described above, unitary matrix implementation system 102 can comprise one or more computer and/or machine readable, writable and/or executable components and/or instructions that, when executed by processor 104, can facilitate performance of one or more operations defined by such component(s) and/or instruction(s). In one or more embodiments, unitary matrix implementation system 102 can comprise a database component 108, determination component 110, unitary matrix management component (UMMC) 112, swap component 114 and/or output component 116.

For example, the unitary matrix implementation system 102 can comprise a database component 108 that can store compiled unitary matrices and/or information (e.g., metadata) relating thereto. The compiled unitary matrices can be stored by the database component 108 at the database component 108, at the memory 106, in the cloud and/or at any other memory internal and/or external to the non-limiting system 100. Additionally and/or alternatively, the unitary matrix implementation system 102 can employ one or more non-compiled unitary matrices. Non-compiled unitary matrices, such as the illustrated defined unitary matrix 126, can be stored at the memory 106, in the cloud and/or at any other memory internal or external to the non-limiting system 100.

Referred to hereafter simply as unitary matrices (e.g., compiled unitary matrices and/or non-compiled unitary matrices), each unitary matrix, including the defined unitary matrix 126, can perform respective quantum functions and/or computations. Each unitary matrix can include associated therewith, such as stored therewith and/or referenced but stored separately therefrom, one or more quantum programs. The one or more quantum programs can be stored at the memory 106, in the cloud and/or at any other memory internal and/or external to the non-limiting system 100.

A determination component 110 can obtain (e.g., receive, find, actively search for, have stored therewith, download, stream and/or the like) a unitary matrix for being decomposed for facilitating implementation of the unitary matrix and/or execution of the associated quantum program. For example, in the illustrated embodiment of FIG. 1, the determination component 110 can determine that the defined unitary matrix 126 is to be decomposed such that the defined unitary matrix 126 can be represented as sequence of pulses for operation on a quantum system, such as the quantum system 101. The defined unitary matrix 126 can be associated with a quantum function and/or can comprise quantum circuitry that can perform and/or facilitate performing the quantum function.

The determination component 110 can provide the defined unitary matrix 126 to the unitary matrix management component (UMMC) 112 for decomposition of the defined unitary matrix 126. That is, the determination component 110 can be communicatively coupled, directly and/or indirectly, with the UMMC 112 for facilitating the provision of the defined unitary matrix 126.

Referring now to the UMMC 112, description herein turns first to one or more general descriptions of one or more functions that can be performed by the UMMC 112, prior to describing in greater detail the one or more functions.

Generally, the UMMC 112 can decompose a unitary matrix, such as the defined unitary matrix 126 in the illustration of FIG. 1, through one or more associated abstraction layers. Via decomposition of a unitary matrix of a quantum circuit to a physical pulse abstraction layer (e.g., represented by a sequence of gates that are physically implementable as pulses), the UMMC 112 can facilitate implementation of the unitary matrix on a quantum system. Thus, the UMMC 112 can facilitate operation of the associated quantum circuit on the quantum system. More narrowly, the UMMC 112 can provide a sequence of gates implementable via one or more physical operations on a particular quantum system, such as implementable as a sequence of pulses.

Turning briefly to operation of a pulse in a quantum system, such operation can introduce some associated amount of time spent (e.g., delay) and can introduce some amount of error (e.g., decoherence, over-rotation, pulse or gate miscalibration, crosstalk and/or quantum noise) into the operation of the associated quantum circuit (and thus into execution of the associated quantum program). In one or more cases, where qubits only can exist (or only can be coherent) for a limited amount of time, an objective of operation of a quantum circuit can be to reduce the time of the operation and/or increase the speed of the operation. Time spent to operate the quantum circuit can accordingly reduce the available time of operation on one or more qubits due to the available coherent time of such one or more qubits prior to decoherence of the one or more qubits. With respect to the one or more errors that can be introduced, quantum noise can refer to noise attributable to the discrete and/or probabilistic natures of quantum interactions. Reducing the quantity of pulses operated can reduce occurrence of such errors and thus can increase accuracy of the operation(s) on the qubit(s).

As indicated, to provide a sequence of pulses for operation on a quantum system, the UMMC 112 can provide an associated sequence of gates. In one or more cases, the UMMC 112 can perform decomposition using only one or more gates being universal gates, and thus being implementable via universal pulses. As will be appreciated, one or more pulses can be considered universal in that they can be utilized to construct a majority of and/or any quantum computation(s).

Furthermore, the UMMC 112 can perform decomposition using only one or more gates also being native gates implementable as native pulses on a particular quantum system. That is, a particular quantum system having particular software and/or hardware can operate a defined set of one or more native pulses, i.e., native to that particular quantum system.

For example, in one embodiment, the UMMC 112 can employ only one or more of the following universal and native gates during decomposition: square root of x gates, echo cross resonance (ECR) gates and/or phase gates. For example, the UMMC 112 can be configured, such as being designed, programmed and/or otherwise made capable, to utilize only the aforementioned universal and native gates during a decomposition of a defined unitary matrix. A square root of X gate can be implemented as a square root of X pulse (also referred to as an X90 pulse) and can provide a 90-degree rotation of a qubit state about an X-axis. An ECR gate can be implemented as an ECR pulse, such as being implementing with an echoing procedure, and can provide a 90-degree rotation of a qubit state about a ZX axis. A phase gate is a zero pulse gate that can be performed at the software level and can provide a 90-degree rotation of a qubit state about Z-axis. For example, a quantum system encountering a phase gate can apply the value of the phase to a subsequent pulse, e.g., multiplying the associated pulse waveform by a complex number. Because the phase gate can be performed at the software level, zero delay and zero error can be caused by performance of the phase gate. Accordingly, only the square root of X gates and the ECR gates are directly implemented by physical operations such as physical pulses.

In one or more embodiments, the defined unitary matrix to be decomposed can be any defined 4×4 unitary matrix of a set of all possible candidate 4×4 unitary matrices. A 4×4 unitary matrix, also referred to as an SU(4), is a unitary matrix on two qubits. A 4×4 unitary matrix can appear commonly in quantum computation, such as in optimizing compilers during peep-hole optimization. A 4×4 unitary matrix can be decomposed as (e.g., represented by) a 4×4 matrix. Each 4×4 unitary matrix can have varying parameters. Indeed, a 4×4 unitary matrix can have fifteen (15) varying parameters $\theta_1 \ldots \theta_{15}$, which parameters, for example, can be associated as the one or more rotation angles of single-qubit U-gates representing the 4×4 unitary matrix. Each U-gate can be a 2×2 matrix (also referred to as an SU(2)) parameterized by 3 angles. The set of all possible candidate 4×4 unitary matrices comprises 4×4 unitary matrices having all possible combinations of the fifteen varying parameters. Further, a defined 4×4 unitary matrix of this set of all possible candidate 4×4 unitary matrices can be decomposed in various manners, such as compiling, replacing, simplifying, commuting and/or merging one or more aspects of the defined 4×4 unitary matrix in various order and/or manners. Various defined circuits can result having various sequences of gates implementable into pulses.

As will be described below in additional detail, the UMMC 112 can be capable of decomposing any defined 4×4 unitary matrix of the set of all possible candidate 4×4 unitary matrices not into any of various defined circuits, but instead into a defined circuit. The defined circuit can comprise a sequence of universal gates that is the same sequence of universal gates regardless of the particular defined 4×4 unitary matrix decomposed. Put another way, the same order of the same universal gates can be provided for the implementation of any defined 4×4 unitary matrix of all possible 4×4 unitary matrices, as will be explained below in detail.

Further, the UMMC 112 can provide such decomposition where the same sequence of universal gates 128 has a lowest possible pulse count as decomposable from any defined 4×4 unitary matrix. That is, one or more defined 4×4 unitary matrices can be decomposed into an exemplary sequence of universal gates having a lower pulse count than the same sequence of universal gates 128. However, not all possible defined 4×4 unitary matrices can be decomposed into such exemplary sequence of universal gates. To account for these differences, the same sequence of universal gates 128 is universally achievable via the UMMC 112 regardless of the defined 4×4 unitary matrix being decomposed. And as will be appreciated by one having ordinary skill in the art, the same sequence of universal gates 128 described herein has the lowest possible pulse count of a set of all candidate sequences of universal gates that are universally applicable for implementation of all defined 4×4 unitary matrices of the set of all possible candidate 4×4 unitary matrices. This can be achieved at least in part by the use of only one or more of the aforementioned square root of X gates, ECR gates and/or phase gates.

As also will be described below in additional detail, the UMMC 112 can perform the decomposition of the defined 4×4 unitary matrix 126 in a manner that achieves and/or enables increased commuting and/or merging of one or more aspects (e.g., components, gates and/or the like) of the defined 4×4 unitary matrix. That is, the UMMC 112 can decompose one or more abstraction layers of the defined 4×4 unitary matrix 126 in a manner that provides the same sequence of universal gates 128 comprising peripheral gates having higher cost. That is, peripheral gates at respective left and right peripheries of the same sequence of universal gates 128 can be implementable via a larger quantity of physical operations as compared to central gates of the sequence of universal gates disposed between the peripheral gates. In this way, where the defined 4×4 unitary matrix is combined with other aspects (e.g., components, gates and/or the like) in a parent quantum circuit, the peripheral gates can be merged and/or commuted with other such aspects disposed directly left and/or right of the same sequence of universal gates 128. This selective location of high cost portions of the same sequence of universal gates 128 can enable further pulse reduction in such parent quantum circuit.

As further will be described below in additional detail, the UMMC 112 can perform the decomposition of the defined 4×4 unitary matrix in the native two-qubit gate direction of the hardware of the qubits on which the defined 4×4 unitary matrix/quantum circuit will be implemented. That is, for the two qubits on which a 4×4 unitary matrix will be implemented, the hardware having the qubits has a native two-qubit gate direction. While many quantum systems can implement one or more gates in both the native two-qubit gate direction and a direction opposite the native two-qubit gate direction, it will be appreciated that there can be a desired direction. That is, gates implemented in the native gates of hardware of a quantum system can lead to increased speed and reduced error of the implementation, as compared to implementation in the direction opposite the native gate. In one or more cases, this native gate can be in a direction from a control qubit to a non-control qubit.

When the UMMC 112 performs a decomposition, if the gates are not implemented in the associated native two-qubit gate direction, the swap component 114 can employ a doubly-mirrored circuit identity to implement the desired unitary matrix/matrices on the two respective qubits in the native two-qubit gate direction, to be explained below with reference to FIG. 7. In this way, incurrence of extra single-qubit gates, such as H gates, can be avoided to flip entangling gates in the native gate. That is, again, the unitary matrix implementation system 102 can enable further pulse reduction in a quantum circuit.

Figure 2:
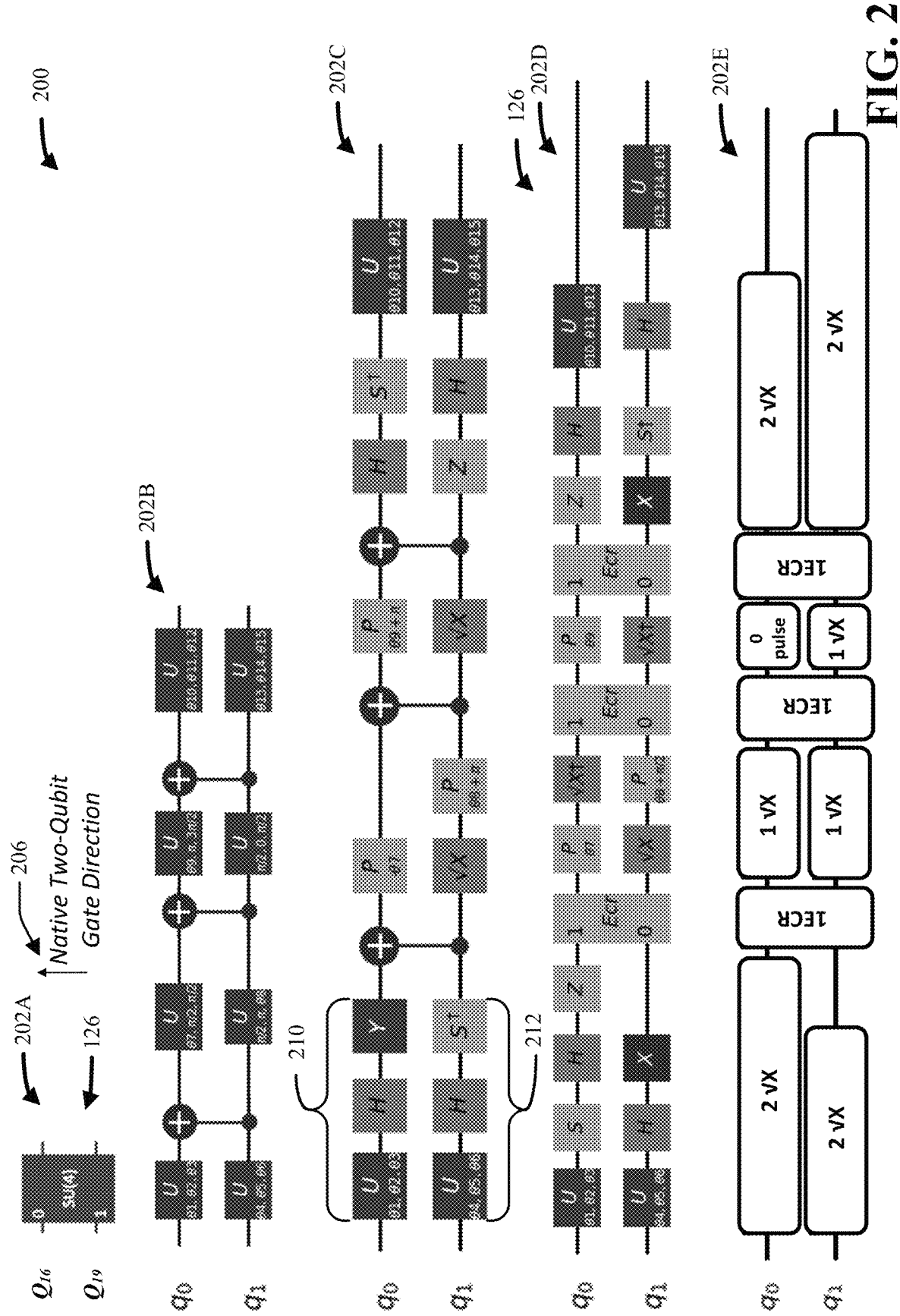
FIG. 2 illustrates a diagram of a set of abstraction layers representing of an exemplary 4×4 unitary matrix, in accordance with one or more embodiments described herein.

Turning now to FIG. 2, to ultimately provide the same sequence of universal gates 128, the UMMC 112 can perform the decomposition of the defined 4×4 unitary matrix 126 as shown at the illustration 200. As indicated above, aspects (e.g., components, gates and/or the like) of a quantum circuit, and in the case of the defined unitary matrix 126, aspects of the associated 4×4 unitary matrix, can be decomposed, such as being compiled, replaced, simplified, commuted and/or merged. For example, the UMMC 112 can continuously replace one or more aspects with one or more representative other aspects, commute aspects and/or merge two or more directly adjacent aspects together along the respective quantum circuit. These actions can enable the defined 4×4 unitary matrix 126 to progress through the various abstraction layers 202A-202E illustrated at FIG. 2.

The various abstraction layers 202A-202E can include a unitary matrix layer 202A (e.g., high quantum computation layer), a unitary matrix circuit layer 202B (e.g., quantum circuit layer), one or more physical circuit layers (e.g., a first physical circuit layer 202C and a second physical circuit layer 202D), and a physical pulse layer 202E.

The illustrated unitary matrix layer 202A can be represented by the defined 4×4 unitary matrix 126. This quantum circuit is operational on two qubits, $Q_{16}$ and $Q_{19}$, also represented here in other abstraction layers more generally as qubit-0 and qubit-1. As illustrated at FIG. 2, the native gate 206 relative to the illustrated $Q_{16}$ and $Q_{19}$ on the quantum system 101 is from $Q_{19}$ to $Q_{16}$.

To accomplish this decomposition of a defined 4×4 unitary matrix, the UMMC 112 can employ one or more defined decompositions and/or circuit identities. For example, the UMMC 112 can be configured, such as being designed, programmed, trained and/or otherwise made capable of automatically applying one or more of these decompositions and/or circuit identities to achieve the same sequence of universal gates 128, and/or to achieve one or more decomposition objectives.

Figure 5:
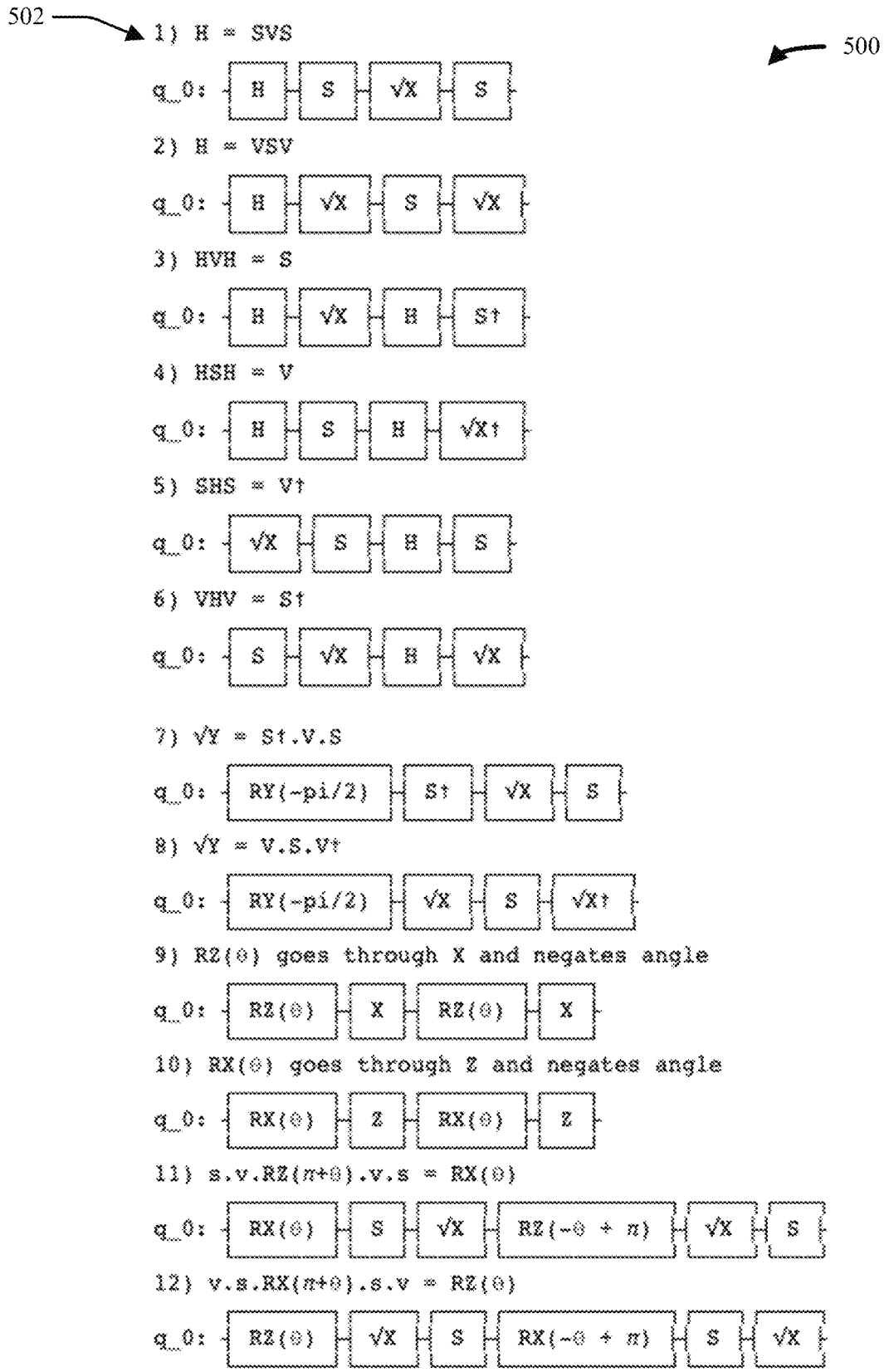
FIG. 5 illustrates a set of candidate circuit identities that can be implemented to provide the set of abstraction layers of FIG. 2, in accordance with one or more embodiments described herein.

The one or more defined decompositions can be one or more known decompositions such as a Cartan's KAK decomposition. The one or more circuit identities can be one or more of a set of circuit identities made available to the UMMC 112. For example, the UMMC 112 can download, receive and/or otherwise access such list, such as the candidate set 500 of the candidate circuit identities 502 illustrated at FIGS. 5 and 6. The candidate set 500 can be stored at the UMMC 112, the database component 108, the memory 106, the cloud and/or any other suitable storage location. As indicated, the UMMC 112 can be configured, such as being designed, programmed, trained and/or otherwise making the UMMC 112 capable of applying these candidate circuit identities 502. Each of these candidate circuit identities 502 represents one or more algebraic steps that can be employed by the UMMC 112 to facilitate the continued replacement, commutation and/or merging of aspects of the defined 4×4 unitary matrix 126 ultimately into the same sequence of universal gates 128. It will be appreciated that these candidate circuit identities 502 and use of thereof is understood by one having ordinary skill in the art. For example certain of the candidate circuit identities 502 can be and/or are suitable to be applied to peripheral U-gates while others can be and/or are suitable to be applied to internal U-gates.

With respect to the one or more aforementioned decomposition objectives, the UMMC 112 can be configured (e.g., designed, instructed, programed, trained and/or the like) to utilize only one or more of a certain set of candidate universal and native gates, such as the aforementioned set of candidate universal and gates: square root of X gate, ECR gate and phase gate. This set of candidate native gates can be selectively or automatically provided to the UMMC 112.

The UMMC 112 additionally and/or alternatively can be configured (e.g., designed, instructed, programed, trained and/or the like) to apply the one or more candidate circuit identities 502 in a manner that employs costly and mergeable gates at the left and right peripheries of the resulting decomposed layers of the quantum circuit of the defined 4×4 unitary matrix 126. As used herein, cost can refer to quantity of gates, delay time and/or introduced error. For example, with respect to the aforementioned set of candidate universal gates, decomposing chains of single-qubit gates at the left and right peripheries can enable enhanced circuit operation. This is because of a particular circuit identity, referred to here as the chain circuit identity, where a chain of single-qubit gates can be implemented as no more than two (2) square root of X gates, and thus operated as no more than two (2) square root of X pulses. Further, where one or more other aspects (e.g., components, gates and/or the like) are provided at the left and right peripheries of the defined 4×4 unitary matrix 126, such as in a larger parent quantum circuit, merging can be enabled. The decomposed chains of single-qubit gates at the left and right peripheries of a decomposed quantum circuit of the defined 4×4 unitary matrix 126 can be merged with immediately adjacent single-qubit gates and/or chains of single-qubit gates. And thereafter the chain circuit identity can be applied to the larger merged chain of single-qubit gates still resulting in no more than two (2) square root of X gates replacing/representing the larger merged chain of single-qubit gates.

With respect to any of the aforementioned candidate decompositions, candidate set of circuit entities and/or decomposition objectives, the UMMC 112 can be configured, such as being designed, programmed, trained and/or otherwise making the UMMC 112 capable of decomposition relative thereto.

Turning now to the exemplary decomposition illustrated at FIG. 2, a transition from the unitary matrix layer 202A to the unitary matrix circuit layer 202B can be provided, such as by employing a candidate decomposition by the UMMC 112. For example, Cartan's KAK decomposition can be applied to provide the unitary matrix circuit layer 202B. The unitary matrix circuit layer 202B can comprise one or more quantum components that can form a desired quantum circuit that can perform a desired quantum function and/or computation. The unitary matrix circuit layer 202B can include the use of multi-qubit gates that can be decomposed (e.g., broken down) to one or more two-qubit gates (that also are multi-qubit gates) and/or single-qubit gates, as desired.

Regarding particular decomposition of the illustrated unitary matrix layer 202A to the unitary matrix circuit layer 202B, by applying a Cartan's KAK decomposition, a SU(4) unitary can be decomposed to a unitary matrix circuit layer having four 1-qubit U-gates at each of qubit-0 and qubit-1, with each vertical pair of 1-qubit U-gates separated by a CNOT gate. That is, by applying a Cartan's KAK decomposition to the defined 4×4 unitary matrix 126, the UMMC 112 can provide as a result the unitary matrix circuit layer 202B. The UMMC 112 further can determine the parameters of the different 1-qubit U-gates, which each can be parameterized by three angles. It will be appreciated by one having skill in the art that the particular parameters does not change the resultant circuit structure, as described below with reference to the second physical circuit layer 202D and the physical pulse layer 202E.

Transition from the unitary matrix circuit layer 202B to each of the successive physical circuit layers 202C and 202D can be made by way of employing one or more of the aforementioned candidate circuit identities as determined by the UMMC 112. Generally, these physical circuit layers (e.g., first and second physical circuit layers 202C and 202D) can relate to one or more physical (e.g., hardware) components of the physical circuit that can be mapped and translated to native gates (e.g., native quantum gates). A physical circuit, e.g. as shown at 202C and 202D, can correspond to, and can be mapped and translated to, a set or sequence of native gates, such as the aforementioned set of candidate universal gates that can be implemented as pulses being native to the respective hardware.

For example, one or more of the candidate circuit identities 502 can be applied to the left peripheral U-gate at each of qubit-0 and qubit-1 to provide the qubit-0 left peripheral chain 210 and the qubit-1 left peripheral chain 212 illustrated at FIG. 2. Each of these peripheral chains 210 and 212 comprises a chain of single-qubit gates. It will be appreciated that one or more of the gates, such as the CNOT gates, are multi-qubit gates.

Although not illustrated with respect to the illustration 200, where the resultant CNOT gates are not aligned relative to the aforementioned native two-qubit gate direction of hardware on which the quantum circuit of the defined 4×4 unitary matrix 126 is to be implemented, a doubly-mirrored circuit identity can be applied, such as by the swap component 114. An exemplary illustration of such process is described below with reference to FIG. 7, where the doubly-mirrored circuit identity is described in detail.

Figure 3:
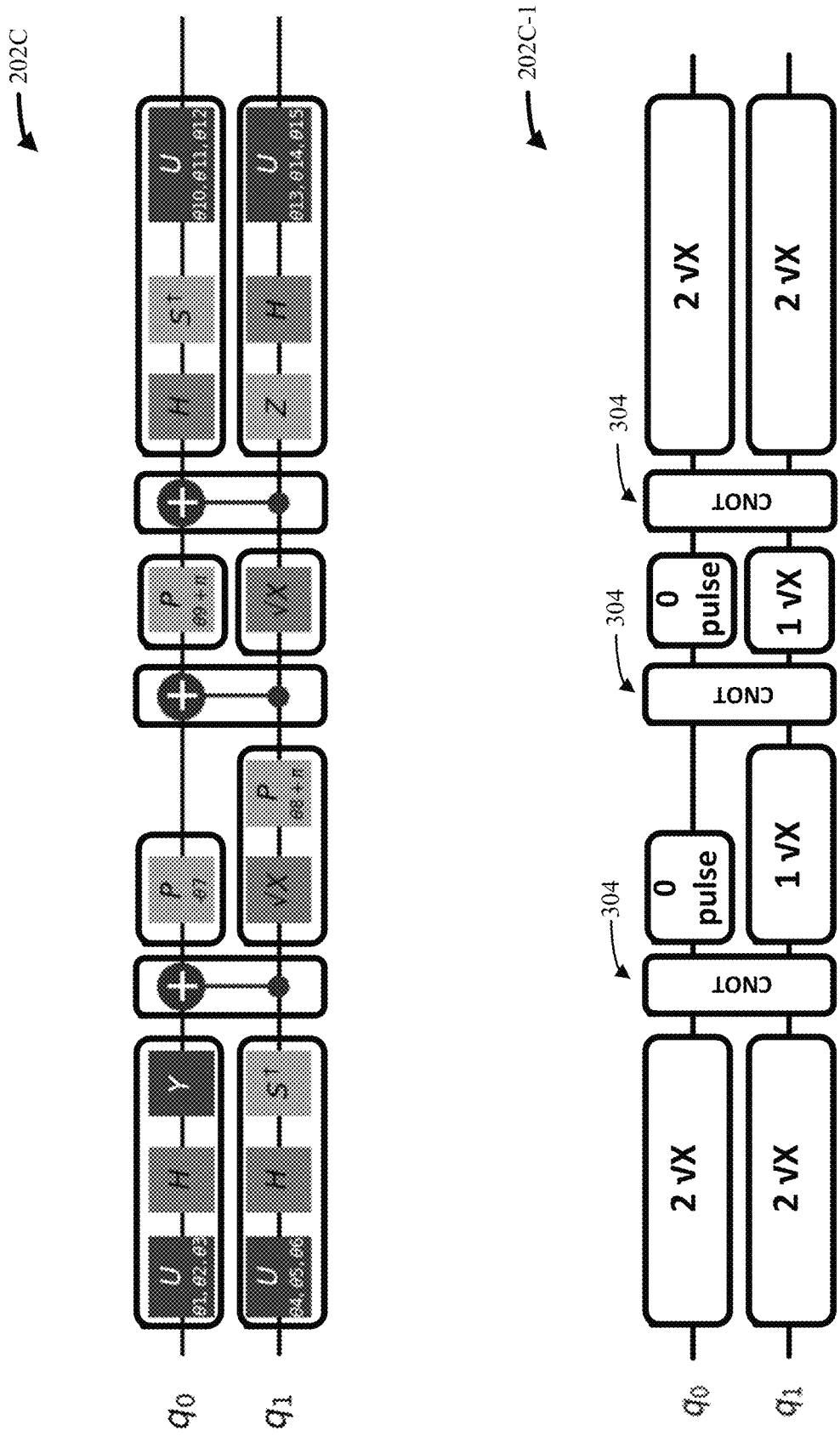
FIG. 3 illustrates a diagram of an exemplary decomposition of the 4×4 unitary matrix of FIG. 2, in accordance with one or more embodiments described herein.

Turning briefly to FIG. 3, the first physical circuit layer 202C is illustrated along with a representation 202C-1 that generally illustrates the pulses that can be employed to operate the quantum circuit as provided at the first physical circuit layer 202C. The representation 202C-1 is provided to illustrate a starting point for a reduction in total pulses of the respective quantum circuit from the first physical circuit layer 202C to the second physical circuit layer 202D. It will be appreciated that the representation 202C-1 is not the final sequence of universal pulses for operating the quantum circuit, i.e., is not the same sequence of universal pulses representing and for implementing the same sequence of universal gates 128. Further, it will be appreciated that the CNOT gates 304 illustrated are not pulses, but rather decomposition beyond the CNOT gates enables implementation of the CNOT gates.

As shown, qubit-0 at the first physical circuit representation layer 202C-1 can be represented by, from left to right, 2 square root of X pulses, a CNOT gate, a phase gate/0 pulse, a CNOT gate, a phase gate/0 pulse, a CNOT, and 2 square root of X pulses. The qubit-1 at the first physical circuit representation layer 202C-1 can be represented by, from left to right, 2 square root of X pulses, a CNOT gate, a square root of X pulse, a CNOT gate, a square root of X pulse, a CNOT gate, and 2 square root of X pulses.

Figure 4:
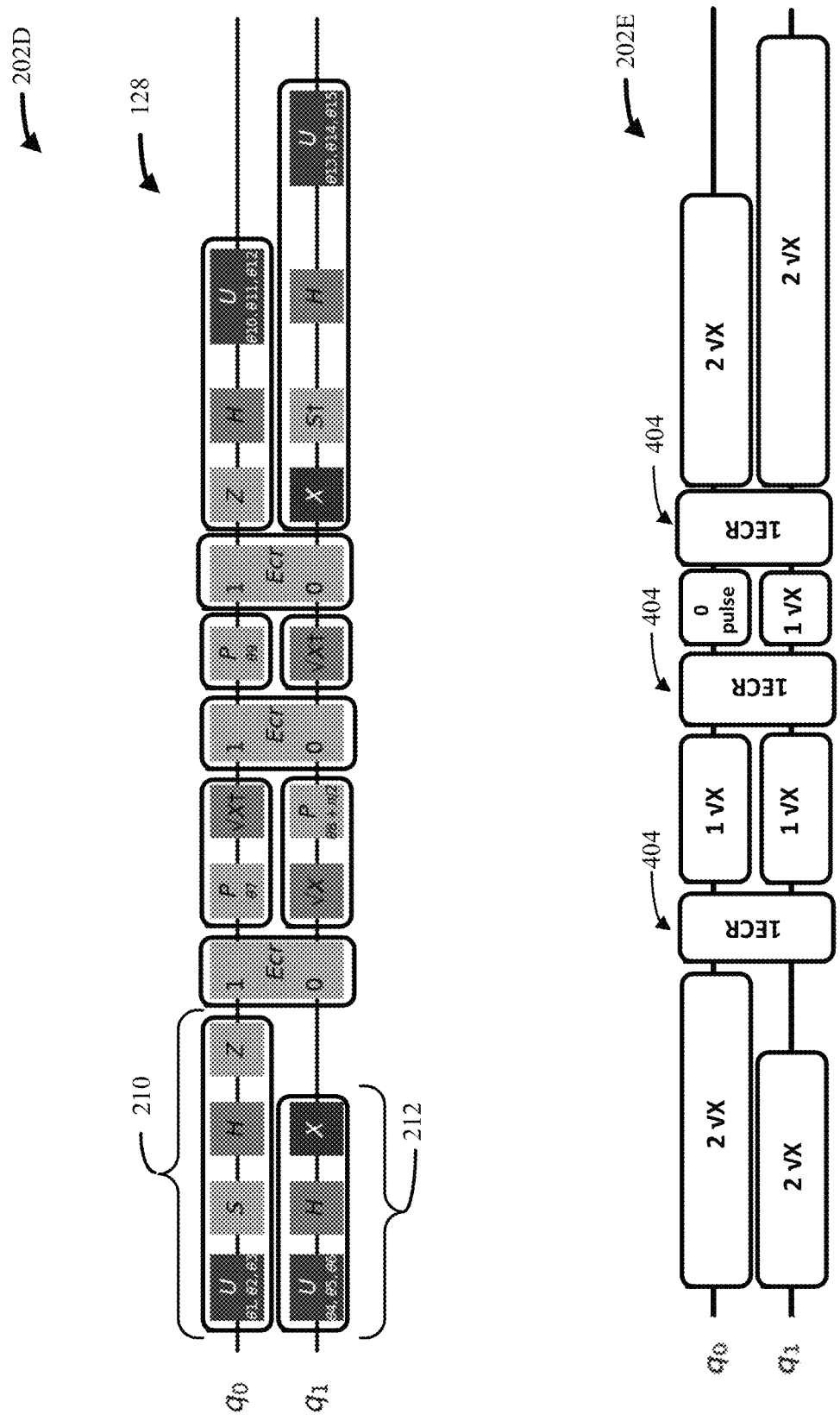
FIG. 4 illustrates a diagram of an exemplary further decomposition of the 4×4 unitary matrix decomposition of FIG. 3, in accordance with one or more embodiments described herein.

Referring next both to FIG. 2 and FIG. 4, the transition from the first physical circuit layer 202C to the second physical circuit layer 202D can be made by the UMMC 112, by again employing one or more of the aforementioned candidate circuit identities 502 as determined by the UMMC 112. Maintained are the qubit-0 left peripheral chain 210 and the qubit-1 left peripheral chain 212 (and also the associated right peripheral chains), although with one or more different single-qubit gates each. The CNOT gates each are replaced by a pair of square root of X gates and an ECR gate, such as via employing one or more of the candidate circuit identities 502. Though, as explained above, using an ECR gate employed beyond a CNOT gate can enable absorption of rotation in other gates (e.g., the pair of square root of X gates), thus leaving only the ECR gate 404 in place of the CNOT gate. It will be appreciated that one or more of the gates, such as the ECR gates 404, are multi-qubit gates.

The second physical circuit layer 202D is the same sequence of universal gates 128. Referring still to FIGS. 2 and 4, the second physical circuit layer 202D can be decomposed to the physical pulse layer 202E. The physical pulse layer 202E can relate to physical pulses, such as a sequence of physical pulses, that can be applied to quantum components, such as qubits, to facilitate controlling operation of the quantum components (e.g., to control a qubit to place the qubit in a desired state at a desired time). A qubit effector, such as a qubit oscillator, harmonic oscillator, pulse generator and/or the like (not shown in the figures) can be coupled to and/or be part of the quantum system 101 and can generate the physical pulses to the respective quantum components of the quantum system 101.

The physical pulse layer 202E is the same sequence of universal pulses for implementing the same sequence of universal gates 128. As shown, qubit-0 at the physical pulse layer 202E can be represented by, from left to right, 2 square root of X gates, 1 ECR gate, a square root of X gate, an ECR gate, a phase gate, an ECR gate, and 2 square root of X gates. The qubit-1 at the physical pulse layer 202E can be represented by, from left to right, 2 square root of X gates, an ECR gate, a square root of X gate, an ECR gate, a square root of X gate, an ECR gate, and 2 square root of X gates. As illustrated, the phase gate at qubit-1 employs 0 pulses. Thus, a total pulse count for operating the quantum circuit shown at the physical pulse layer 202E is 14 total pulses (e.g., 3 ECR pulses and 11 square root of X pulses).

Referring now to FIGS. 1-6, in one or more embodiments, the UMMC 112 alternatively can be configured, such as being designed, programmed and/or otherwise made capable, to output the same sequence of universal gates 128 and/or a quantum circuit of the associated same sequence of universal pulses (e.g., physical pulse layer 202E) absent use of the one or more defined circuit identities 502. That is, the applicant has discovered and confirmed that the same sequence of universal gates 128 can be provided for the implementation of any defined 4×4 unitary matrix of all possible 4×4 unitary matrices. Accordingly, the UMMC 112 can be capable of bypassing one or more of the abstraction layers described above when inputting any unitary layer (e.g., unitary matrix layer 202A) or unitary matrix circuit layer (e.g., unitary matrix circuit layer 202B). The UMMC 112 instead can be configured, such as being designed, programmed and/or otherwise made capable, to recognize a unitary matrix as a 4×4 unitary matrix (e.g., the defined 4×4 unitary matrix 126) and to merely exchange such unitary matrix as the same sequence of universal gates 128 and/or a quantum circuit of the associated same sequence of universal pulses (e.g., physical pulse layer 202E). In doing so, the UMMC 112 still can provide decomposition outputting a sequence having a lowest possible pulse count as decomposable from any defined 4×4 unitary matrix, the sequence achieving and/or enabling increased commuting and/or merging of one or more aspects (e.g., components, gates and/or the like) of the unitary matrix, and the sequence utilizing only one or more of a certain set of candidate universal and native gates, such as the aforementioned set of candidate universal and gates: square root of X gate, ECR gate and phase gate. In connection therewith, depending on the defined direction of the unitary matrix quantum circuit, the swap component 114 can be employed to output a resulting quantum circuit having a native 2-qubit gate direction of hardware on which the quantum circuit is to be implemented.

Figure 7:
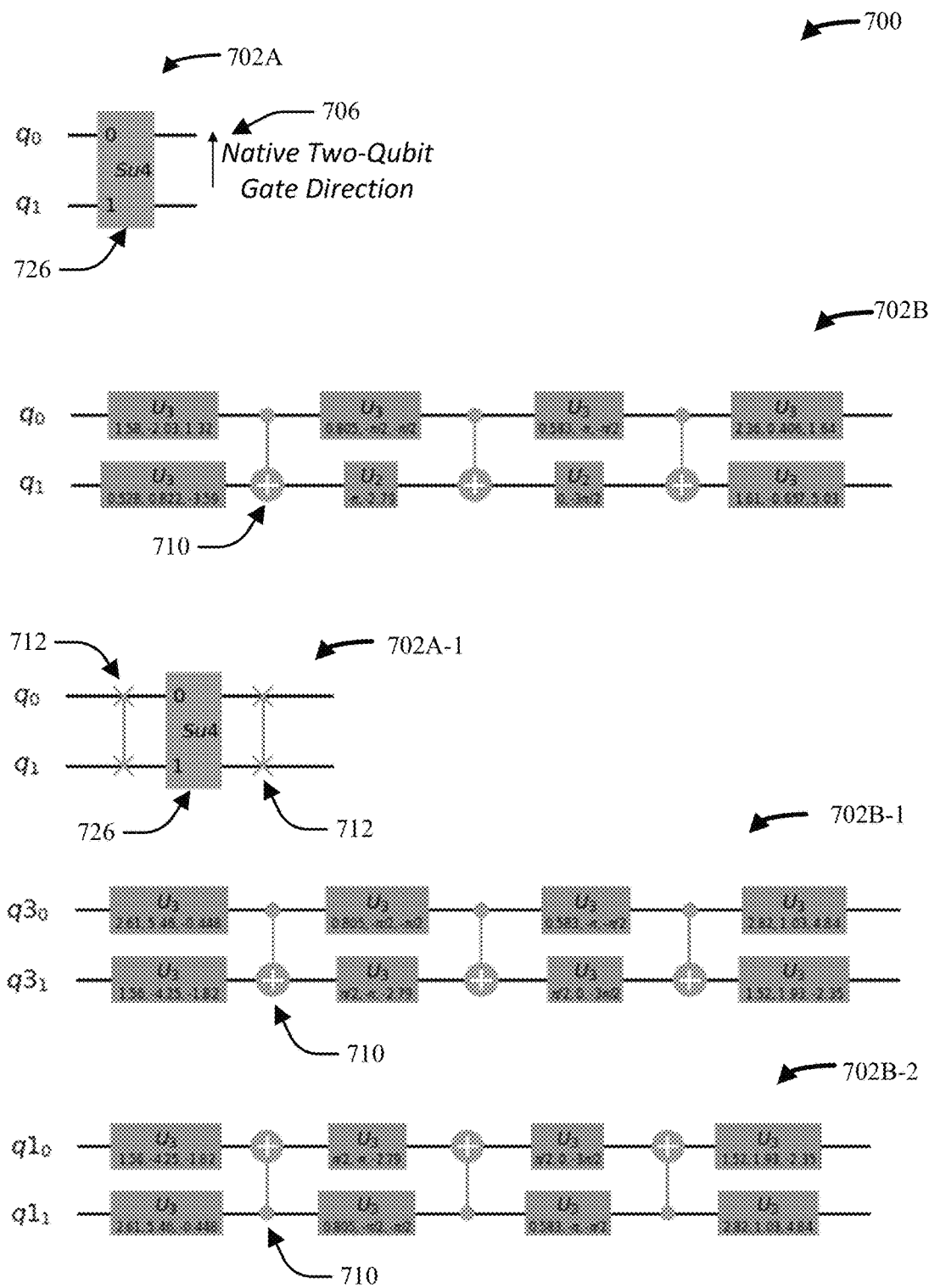
FIG. 7 illustrates a diagram of a set of abstraction layers representing another exemplary 4×4 unitary matrix, in accordance with one or more embodiments described herein. The diagram includes illustration of implementation of swap gates and of vertical flipping on the exemplary 4×4 unitary matrix of FIG. 7.

Referring next to FIG. 7 and also to FIG. 1, the unitary matrix implementation system 102 also can comprise the swap component 114. As briefly referenced above, the swap component 114 can employ a doubly-mirrored circuit identity to change the direction of a two-qubit quantum circuit, such as of a defined 4×4 unitary matrix of the quantum circuit. For example, as indicated above, the swap component 114 can operate the doubly-mirrored circuit identity to change the direction of the defined 4×4 unitary matrix 126, particularly as a part of the transition from the unitary matrix circuit layer 202B to the first physical circuit layer 202C. It is noted that the doubly-mirrored circuit identity can be applied to a 4×4 unitary matrix of a larger quantum circuit, even where other circuit aspects are disposed left and/or right of the 4×4 unitary matrix.

The doubly-mirrored circuit identity employed by the swap component 114 includes applying a swap gate at each of the left and right peripheries of the defined 4×4 unitary matrix 126 and vertically flipping the defined 4×4 unitary matrix 126. A swap gate is a reversible logic gate that interchanges the input bits at the output, and thus is employed only via software and employs 0 pulses. Either swap gate can be applied first. Vertical flipping can be applied after application of the swap gates.

For example, the swap gates can be applied to compile an original SU(4) different from the original SU(4) prior to application of the swap gates. After the application of the swap gates, the different SU(4) can be not-yet-equal to the original SU(4), and also can include CNOT gates in a direction opposite the desired native gate. During further decomposition of the different SU(4), vertical flipping is applied, such as of the associated unitary matrix circuit layer 202B, thus flipping the quantum circuit vertically. The resultant flipped and different SU(4) can be equivalent to the original SU4, and also can include CNOT gates in the desired native gate.

An exemplary illustration 700 of the performance of the doubly-mirrored circuit identity by the swap component 114 is provided at FIG. 7 with reference to a different unitary matrix, the defined 4×4 unitary matrix 726. As shown at FIG. 7, decomposition of the unitary matrix layer 702A of the defined 4×4 unitary matrix 726 to a unitary matrix circuit layer 702B implements CNOT gates having a two-qubit gate direction opposite of the native two-qubit gate direction 706 of the hardware on which the defined 4×4 unitary matrix 726 will be operated. Instead, via the swap component 114, a modified unitary matrix layer 702A-1 can be implemented having a swap gate 712 applied at each of the left and right peripheries of the defined 4×4 unitary matrix 726. The modified unitary matrix circuit layer 702B-1 can result absent application of any physical pulses. The modified unitary matrix circuit layer 702B-1 can then be vertically flipped resulting in the unitary matrix circuit layer 702B-2. The unitary matrix circuit layer 702B-2 includes the CNOT gates implemented in the respective native two-qubit gate direction 706.

After further decomposition, such as by the UMMC 112, the defined 4×4 unitary matrix 726 can be operated on a quantum system, such as the quantum system 101, without incurring one or more extra single-qubit H gates to flip direction of the CNOT gates. Further, as indicated above, gates implemented in the native gate of hardware of a quantum system can lead to increased speed and/or reduced error of the implementation, as compared to implementation in the direction opposite the native gate. This increased speed and/or reduced error can be at least partially due to the implementation of fewer gates (i.e., without the one or more extra single-qubit H gates not employed) and the operation of fewer respective pulses (i.e., from the one or more extra single-qubit H gates not employed).

In one or more other embodiments, it will be appreciated that the processes described with respect to FIG. 7 can be performed on one or more of the abstraction layers of a quantum circuit described above. That is, the non-limiting system 100 and/or the unitary matrix implementation system 102 is not limited to a single order of performance of one or more processes by the swap component 114 and UMMC 112.

Referring again briefly to FIG. 1, the unitary matrix implementation system 102 also can comprise an output component 116. The output component 116 can send (e.g., via wireless, wired, cloud and/or network connection) an output from the UMMC 112 to the quantum system 101 for operation on qubits at the quantum system 101. That is, the output component 116 can send a processed job request 130, such as including the same sequence of universal gates 128 and/or the associated same sequence of universal pulses, to the quantum system 101, such as to the quantum operation component 103. The quantum operation component 103 and/or the quantum processor 105 can in turn operate the quantum circuit, including implementing the same sequence of universal gates 128, on respective qubits at the quantum system 101.

Figure 8:
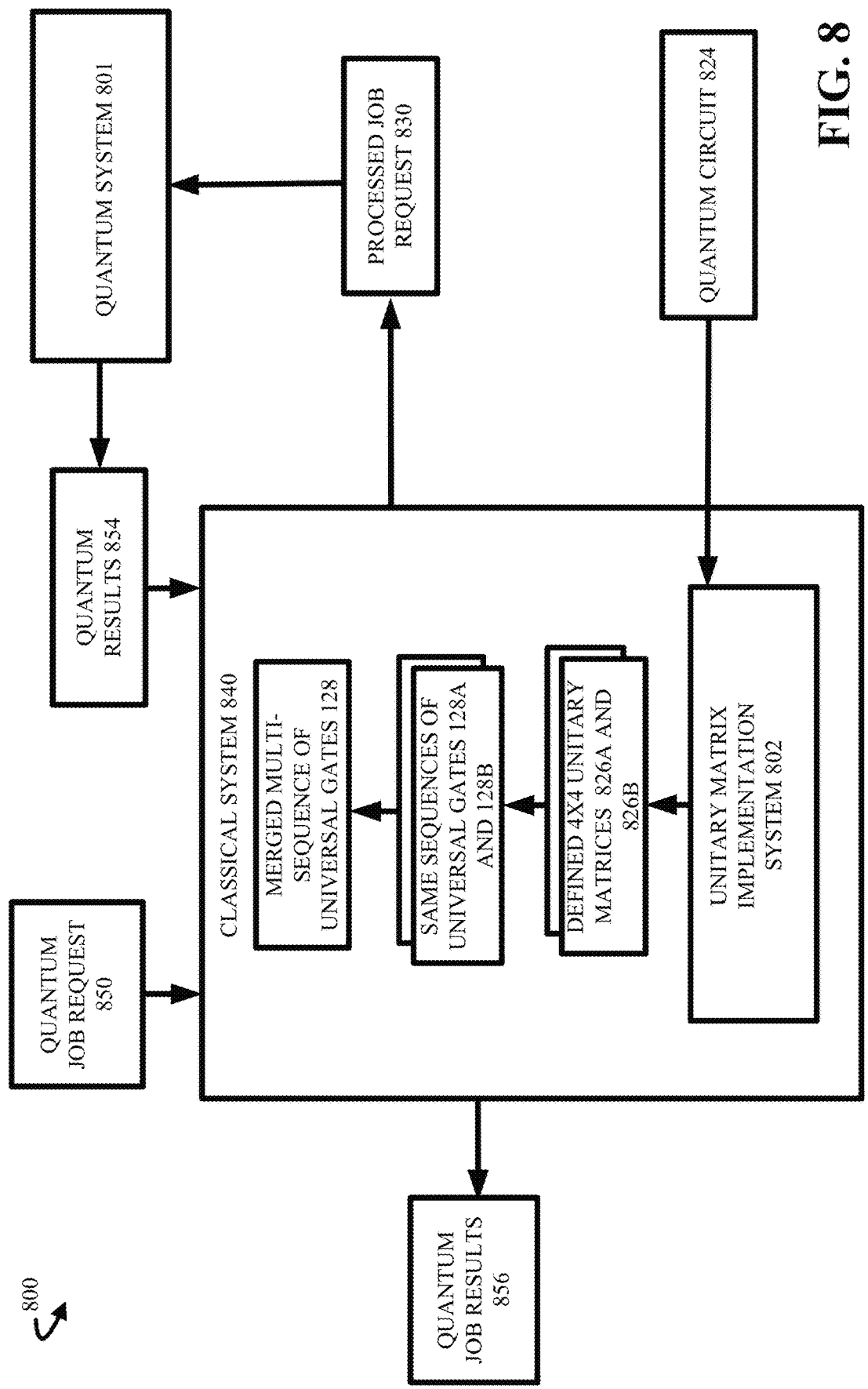
FIG. 8 illustrates a block diagram of another example, non-limiting system that can facilitate obtaining and executing a quantum job, in accordance with one or more embodiments described herein.

Turning now to FIG. 8, illustrated is a diagram of an example, non-limiting system 800 that can facilitate operation of a quantum circuit on a set of qubits. Repetitive description of like elements and/or processes employed in the embodiment of the non-limiting system 100 of FIG. 1 is omitted for sake of brevity.

The non-limiting system 800 is a hybrid system that comprises a quantum system 801 and a classical system 840. The classical system 840 can receive, download, stream and/or otherwise obtain a quantum job request 850 from a requesting entity. Employing the unitary matrix implementation system 802 and the quantum system 801, the non-limiting system 800 can execute the quantum job request 850.

For example, the classical system 840 can comprise a unitary matrix implementation system 802. The unitary matrix implementation system 802 can determine a quantum circuit 824 to be used to execute at least a part of the quantum job request 850. The unitary matrix implementation system 802 further can decompose the quantum circuit 824 into a plurality of defined 4×4 unitary matrices, including the defined 4×4 unitary matrix 826A and the defined 4×4 unitary matrix 826B. Each of the defined 4×4 unitary matrices 826A and 826B can be decomposed at least partially simultaneously by the unitary matrix implementation system 802 to output the same sequences of universal gates 128A and 128B respectively representing the defined 4×4 unitary matrices 826A and 826B. Where the defined 4×4 unitary matrices 826A and 826B are disposed directly adjacent one another at an abstraction layer, such as a unitary matrix circuit layer, of the quantum circuit 824, further merging can be performed after provision of the same sequences of universal gates 128A and 128B. That is, the peripheral 2 square root of X gates of each of the respective physical circuit layers can be merged, such as to eliminate 2 square root of X gates from the overall quantum circuit implementation of the quantum circuit 824. As a result, a merged multi-sequence of universal gates 128M can be provided.

The resultant a merged multi-sequence of universal gates 128M can be included in a processed job request 830 sent to the quantum system 801 for operation of the merged multi-sequence of universal gates 28M as an associated merged multi-sequence of universal pulses on qubits at the quantum system 801 (e.g., including the representative merging of 4 square root of X pulses at the adjacent peripheries of the same sequences of universal pulses into only 2 square root of X pulses).

The quantum system 801 can execute the quantum job request 850, based at least in part on the processed job request 830. The quantum system 802 can provide one or more quantum results 854 to the unitary matrix implementation system 802 and/or to the classical system 840. That is, after operation of the respective same sequence of universal pulses, the classical system 840 can receive, download, stream and/or otherwise obtain the one or more quantum results 854 from the quantum system 801. One or more quantum job results 856 can be output from the non-limiting system 800, which one or more quantum job results 856 can comprise and/or can be based at least in part on the one or more quantum results 854, and which can be responsive to the quantum job request 850 from the requesting entity.

The systems and/or devices have been (or will be further) described herein with respect to interaction between several components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

Figure 9:
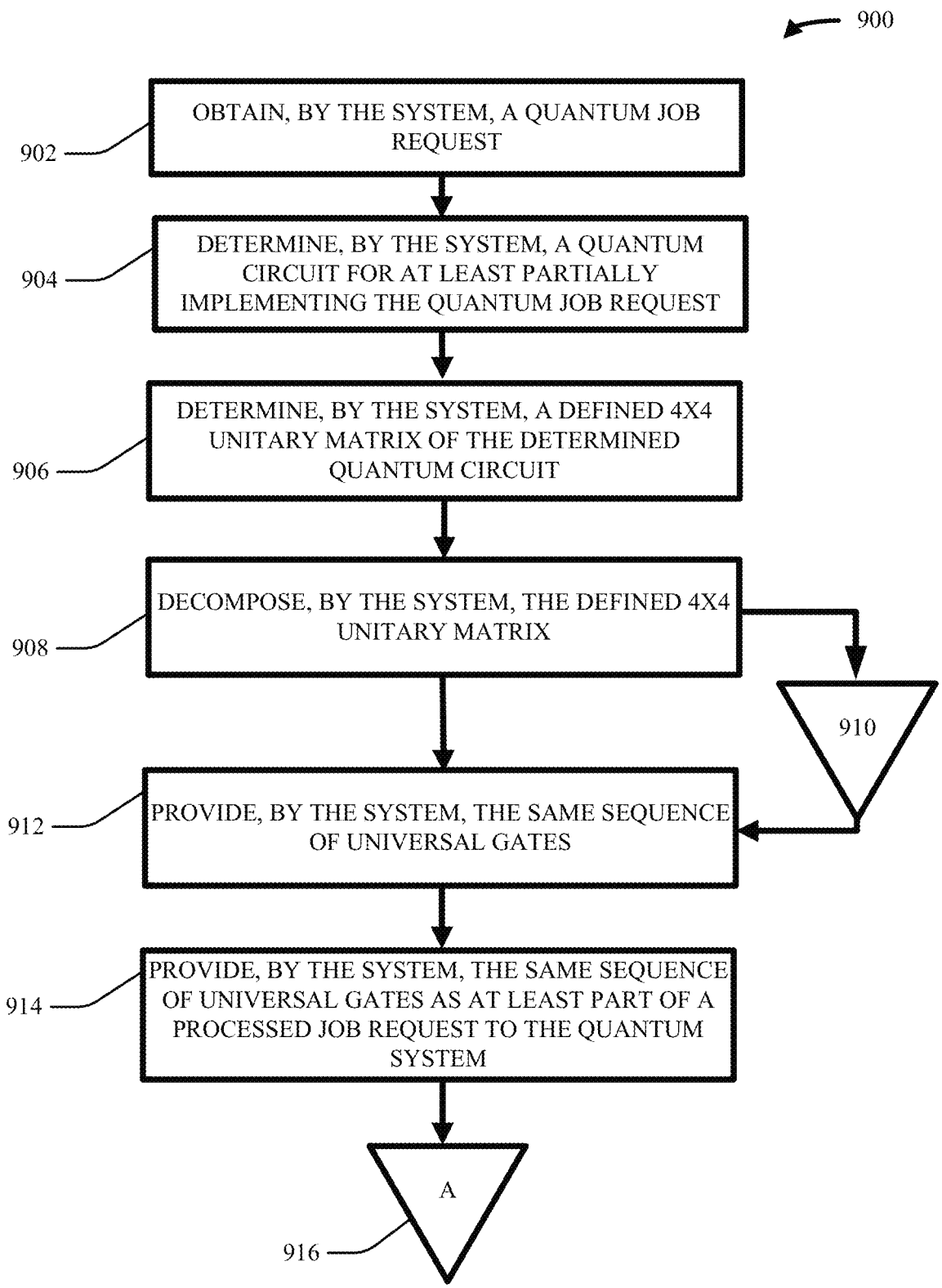
FIG. 9 illustrates a flow diagram of an example, non-limiting computer-implemented method that can facilitate operation of a quantum circuit on a set of qubits via providing and implementing a decomposition of a unitary matrix, in accordance with one or more embodiments described herein.
Figure 10:
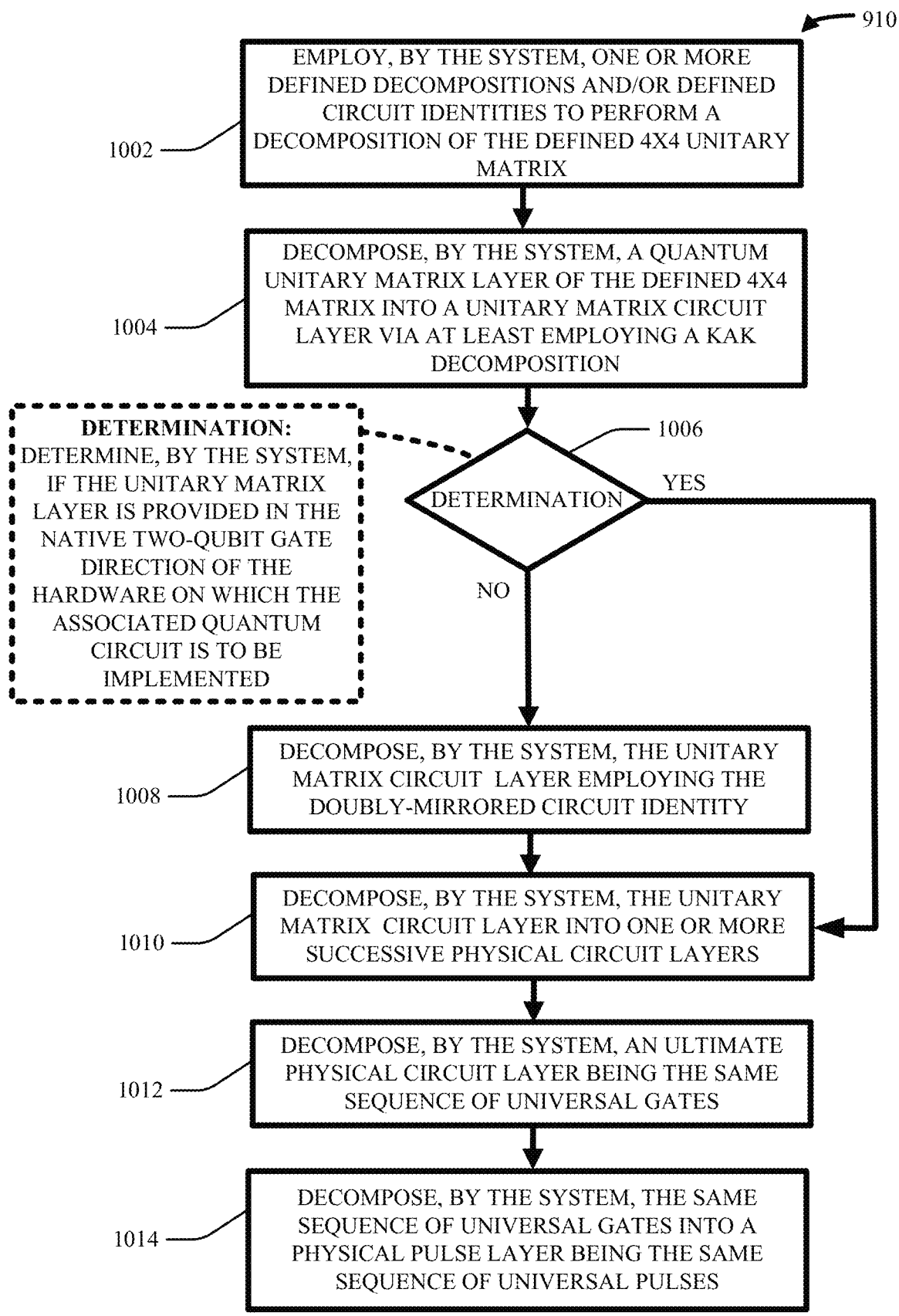
FIG. 10 illustrates a continuation of the flow diagram of FIG. 9, of an example, non-limiting computer-implemented method that can facilitate operation of a quantum circuit on a set of qubits via providing and implementing a decomposition of a unitary matrix, in accordance with one or more embodiments described herein.
Figure 11:
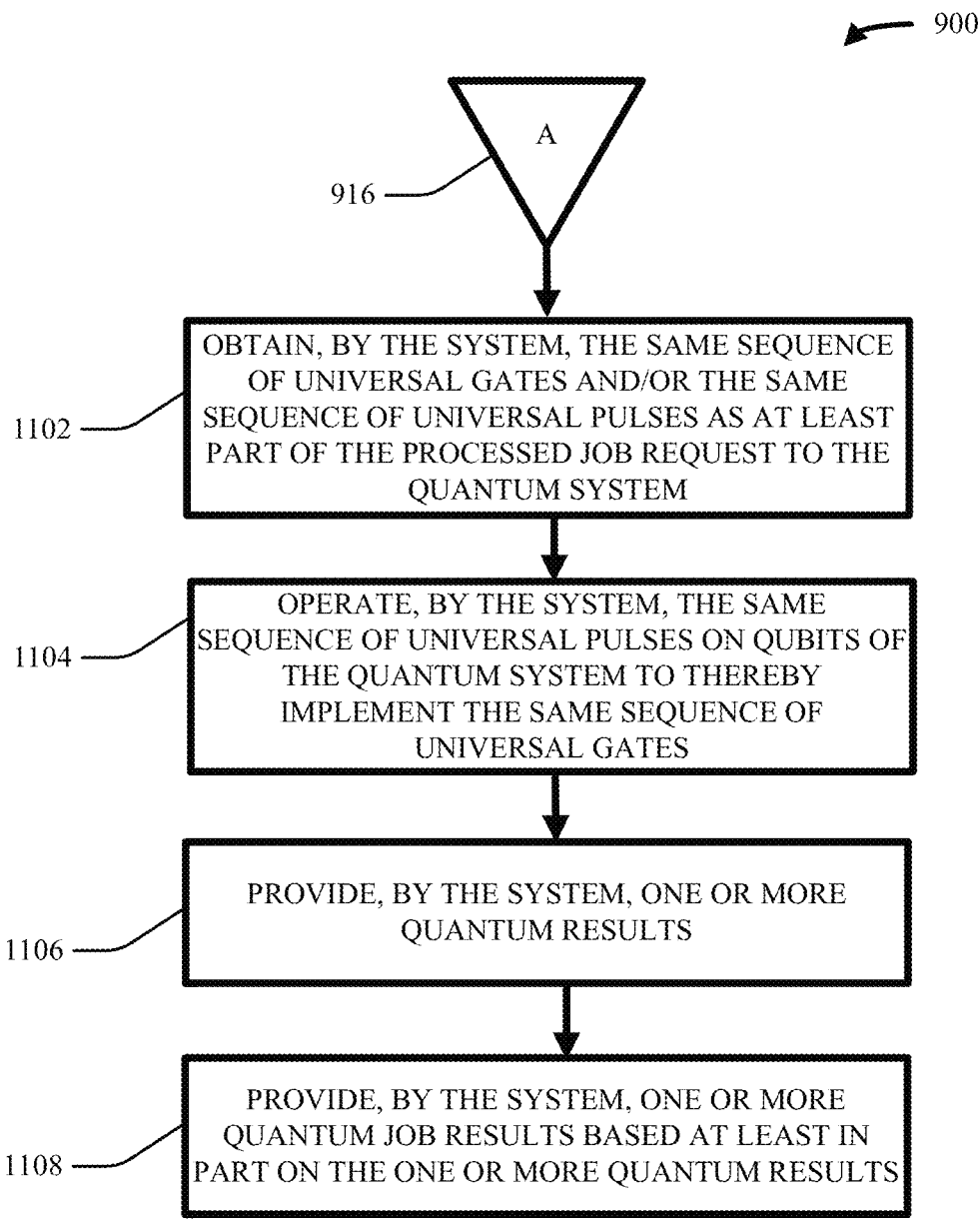
FIG. 11 illustrates a continuation of the flow diagrams of FIGS. 9 and 10, of an example, non-limiting computer-implemented method that can facilitate operation of a quantum circuit on a set of qubits via providing and implementing a decomposition of a unitary matrix, in accordance with one or more embodiments described herein.

Turning now to FIGS. 9 through 11, these figures together illustrate a flow diagram of an example, non-limiting computer-implemented method 900 that can facilitate operation of a quantum circuit on a set of qubits via providing and implementing a decomposition of a unitary matrix, in accordance with one or more embodiments described herein. Repetitive description of like elements and/or processes employed in respective embodiments is omitted for sake of brevity.

Looking first to 902 at FIG. 9, the computer-implemented method 900 can comprise obtaining, by a system (e.g., via non-limiting system 100, 800, unitary matrix implementation system 102, 802 and/or determination component 110) operatively coupled to a processor (e.g., processor 104, a quantum processor and/or like processor), a quantum job request (e.g., quantum job request 850).

At 904, the computer-implemented method 900 can comprise determining, by the system (e.g., via non-limiting system 100, 800, unitary matrix implementation system 102, 802 and/or determination component 110), a quantum circuit for at least partially implementing the quantum job request (e.g., quantum job request 850).

At 906, the computer-implemented method 900 can comprise determining, by the system (e.g., via non-limiting system 100, 800, unitary matrix implementation system 102, 802 and/or determination component 110), a defined 4×4 unitary matrix (e.g., the defined 4×4 unitary matrix 126, 826A, 826B) of the determined quantum circuit.

At 908, the computer-implemented method 900 can comprise decomposing, by the system (e.g., via non-limiting system 100, 800, unitary matrix implementation system 102,802 UMMC 112 and/or swap component 114) the defined 4×4 unitary matrix (e.g., the defined 4×4 unitary matrix 126, 826A, 826B).

Particular processes comprised by this decomposition are denoted as occurring at triangle 910 and are more particularly illustrated at FIG. 10. In one or more embodiments, the processes embodied by triangle 910 (e.g., as illustrated at FIG. 10) can be performed. In one or more other embodiments, one or more of the processes embodied by triangle 910 can be bypassed, such as block 1010.

At 912, the computer-implemented method 900 can comprise providing, by the system (e.g., via non-limiting system 100, 800, unitary matrix implementation system 102, 802, UMMC 112 and/or swap component 114) the same sequence of universal gates (e.g., the same sequence of universal gates 128, 128A, 128B).

At 914, the computer-implemented method 900 can comprise providing, by the system (e.g., via non-limiting system 100, 800 unitary matrix implementation system 102, 802 and/or output component 116) the same sequence of universal gates (e.g., the same sequence of universal gates 128, 128A, 128B) as at least part of a process job request (e.g., processed job request 130, 830) to the quantum system (e.g., quantum system 101, 801). It will be appreciated that additionally and/or alternatively, the computer-implemented method 900 can comprise providing, by the system (e.g., via non-limiting system 100, 800 unitary matrix implementation system 102, 802 and/or output component 116) a same sequence of universal pulses representing and for implementing the same sequence of universal gates (e.g., the same sequence of universal gates 128) as at least part of the process job request (e.g., processed job request 130, 830) to the quantum system (e.g., quantum system 101, 801).

Turning to FIG. 10, this figure illustrates an extension of the computer-implemented method 900 of FIG. 9, and particularly illustrates aspects of the triangle 910, i.e., particular processes of the decomposition occurring at 908 of FIG. 9.

At 1002, the computer-implemented method 900 can comprise employing, by the system (e.g., via unitary matrix implementation system 102, 802, UMMC 112 and/or swap component 114) one or more defined decompositions and/or defined circuit identities (e.g., candidate circuit identities 502) to perform a decomposition of the defined 4×4 unitary matrix (e.g., defined 4×4 unitary matrix 126, 826A, 826B).

At 1004, the computer-implemented method 900 can comprise decomposing, by the system (e.g., via unitary matrix implementation system 102, 802, UMMC 112 and/or swap component 114) a quantum unitary matrix layer (e.g., unitary matrix layer 202A of the defined 4×4 unitary matrix 126, 826A, 826B) into a unitary matrix circuit layer (e.g., unitary matrix circuit layer 202B of the defined 4×4 unitary matrix 126, 826A, 826B) via at least employing a KAK decomposition.

At 1006, the computer-implemented method 900 can comprise determining, by the system (e.g., a unitary matrix implementation system 102, 802, UMMC 112 and/or swap component 114) if the unitary matrix circuit layer (e.g., unitary matrix circuit layer 202B of the defined 4×4 unitary matrix 126, 826A, 826B) is provided in the native two-qubit gate direction of the hardware (e.g., of the quantum system 101, 801) on which the associated quantum circuit (e.g., of the defined 4×4 unitary matrix 126, 826A, 826B) is to be implemented.

Where the answer of the determination at 1006 is no, at 1008, the computer-implemented method 900 can comprise decomposing, by the system (e.g., a unitary matrix implementation system 102, 802, UMMC 112 and/or swap component 114) the unitary matrix circuit layer (e.g., unitary matrix circuit layer 202B of the defined 4×4 unitary matrix 126, 826A, 826B) employing the doubly-mirrored circuit identity (e.g., including employing a pair of swap gates 712 at opposite peripheral sides of the unitary matrix circuit layer 702B and thereafter vertically flipping the modified unitary matrix circuit layer, e.g., as exemplified at FIG. 7). Thereafter, the computer-implemented method 900 can proceed to block 1010.

Where the answer of the determination at 1006 is yes, the computer-implemented method 900 can bypass block 1008 and proceed instead to block 1010.

At 1010, the computer-implemented method 900 can comprise decomposing, by the system (e.g., a unitary matrix implementation system 102, 802, UMMC 112 and/or swap component 114) the unitary matrix circuit layer (e.g., unitary matrix circuit layer 202B of the defined 4×4 unitary matrix 126, 826A, 826B) into one or more successive physical circuit layers (e.g., first physical circuit layer 202C and second physical circuit layer 202D of the defined 4×4 unitary matrix 126, 826A, 826B).

At 1012, the computer-implemented method 900 can comprise decomposing, by the system (e.g., a unitary matrix implementation system 102, 802, UMMC 112 and/or swap component 114) an ultimate physical circuit layer (e.g., second physical circuit layer 202D of the defined 4×4 unitary matrix 126, 826A, 826B) being the same sequence of universal gates (e.g., the same sequence of universal gates 128, 128A, 128B).

At 1014, the computer-implemented method 900 can comprise decomposing, by the system (e.g., a unitary matrix implementation system 102, 802, UMMC 112 and/or swap component 114) the same sequence of universal gates (e.g., the same sequence of universal gates 128, 128A, 128B) into a physical pulse layer (e.g., the physical pulse layer 202E of the defined 4×4 unitary matrix 126, 826A, 826B) being the same sequence of universal pulses (e.g., the same sequence of universal pulses representing and for implementing the same sequence of universal gates 128, 128A, 128B).

Turning next to FIG. 11, this figure illustrates an extension of the computer-implemented method 900 of FIG. 9. Triangle "A" 916 represents a continuation point for moving from FIG. 10 to FIG. 11.

At 1102, the computer-implemented method 900 can comprise obtaining, by the system (e.g., via non-limiting system 100, 800 and/or quantum system 101, 801), the same sequence of universal gates (e.g., the same sequence of universal gates 128, 128A, 128B) and/or the same sequence of universal pulses (e.g., representing and/or for implementing the same sequence of universal gates 128, 128A, 128B) as at least part of the processed job request (e.g., the processed job request 130, 830) to the quantum system (e.g., the quantum system 101, 801).

At 1104, the computer-implemented method 900 can comprise operating, by the system (e.g., via non-limiting system 100, quantum system 101 and/or quantum operation component 103), the same sequence of universal pulses (e.g., representing and/or for implementing the same sequence of universal gates 128, 128A, 128B) on qubits of the quantum system (e.g., quantum system 101) to thereby implement the same sequence of universal gates (e.g., the same sequence of universal gates 128, 128A, 128B).

At 1106, the computer-implemented method 900 can comprise providing, by the system (e.g., via non-limiting system 100, 800 quantum system 101, 801 and/or quantum operation component 103), one or more quantum results (e.g., quantum results 854).

At 1108, the computer-implemented method 900 can comprise providing, by the system (e.g., via non-limiting system 100, 800 and or classical system 840), one or more quantum job results (e.g., quantum job results 856) based at least in part on the one or more quantum results (e.g., quantum results 854).

The computer-implemented methodologies provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. Furthermore, not all illustrated acts can be required to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In one or more instances, one or more embodiments as described herein can integrate the disclosed teachings into a practical application. Indeed, as described herein, one or more embodiments, which can take the form of systems, computer-implemented methods, and/or computer program products can be considered as a computerized tool that can obtain and execute a quantum program at least in part via performing decomposition of a defined 4×4 unitary matrix. In general, the one or more embodiments described herein can reduce the time and/or error incurred by execution of a quantum program. This is a useful and practical application of computers, especially in view of the effect of time and error on decoherence of employed qubits, and thus can facilitate enhanced (e.g., improved and/or optimized) operation of the employed qubits. These enhancements can include increased accuracy of quantum results and/or increased availability of the employed qubits. Overall, such computerized tools can constitute a concrete and tangible technical improvement in the field of quantum parameter provision.

Furthermore, one or more embodiments described herein can control real-world devices based on the disclosed teachings. For example, embodiments described herein can receive as input a quantum job request and can generate as a first output a sequence of universal gates for being implemented as a sequence of real-world pulses on qubits of a quantum system, and as a second output one or more quantum results as a result of the operation of the sequence of real-world pulses on the real-world qubits of the quantum system.

The non-limiting system 100, employing the unitary matrix implementation system 102 (e.g., UMMC 112 and/or swap component 114), can enhance (e.g., improve and/or optimize) quantum programs at the one or more abstraction layers (e.g., at the physical pulse layer 202E, physical circuit layers 202C and 202D, quantum circuit layer 202B and/or high quantum computation layer 202A) to facilitate desirable (e.g., enhanced and/or optimized) quantum circuit execution. For instance, the described subject matter, by employing the UMMC 112 and/or swap component 114, can create an improvement in speed of execution of jobs by the quantum system 101 by performing a decomposition to provide a universally applicable same sequence of universal gates (e.g., the same sequence of universal gates 128) for any possible 4×4 unitary matrix (e.g., the defined 4×4 unitary matrix 126). Further, the resultant decomposition can enable merging with other quantum circuit aspects and/or the decomposition can implement one or more of the abstraction layers in the native two-qubit gate direction of the hardware on which the quantum circuit is to be implemented.

Any one or more of these processes can reduce the number of pulses for operating a quantum circuit, including a defined 4×4 unitary matrix, on the quantum system 101. A reduced number of pulses can be directly correlated to a reduction in time and/or incurred error for operation of the associated quantum circuit. Reduction in operation time and/or incurred error can facilitate enhanced (e.g., improved and/or optimized) function of the quantum system 101 and/or enhanced (e.g., improved and/or optimized) quantum results provided by the operation on the quantum system 101. In one or more cases, these enhancements can be at least partially due to lower occurrence of decoherence of qubits during such execution, due to the reduced time and/or error incurred.

Moreover, where there is high demand for execution of an increased quantity of quantum programs on the quantum system 101, it can follow that use of the non-limiting system 100 (e.g., the unitary matrix implementation system 102, UMMC 112 and/or swap component 114) can facilitate scaled execution of quantum programs. That is, by reducing time and/or error incurred during operation of a quantum circuit on one or more qubits, lower occurrence of decoherence of the one or more qubits can allow for additional quantum programs to be executed on the qubits.

This in turn can lead to a related reduction in provision of new qubits by a quantum system comprising the one or more qubits, and consequently, increased availability of processing capabilities of a quantum processor of a quantum system due, at least in part, to the decreased provision of new qubits. As such, the non-limiting system 100 (e.g., the unitary matrix implementation system 102) can thereby facilitate improved performance, improved efficiency and/or reduced computational cost associated with a quantum processing unit (e.g., quantum processor of the quantum system 101) operating the provided same sequence of universal gates (e.g., as a sequence of universal pulses).

The described subject matter (e.g., non-limiting system 100) can provide similar enhancements with regard to physical circuits, quantum circuits and/or higher-level quantum computations, such as where a circuit comprises and/or can be decomposed to comprise a defined 4×4 unitary matrix.

The described subject matter also can improve execution quality of the execution of quantum jobs by the non-limiting system 100 by implementing the same sequence of universal gates and/or pulse equivalencies thereof, that may not be implemented by automation of a classical system, yet can be implemented by the unitary matrix implementation system 102 (e.g., by the UMMC 112 and/or the swap component 114), comparing many job executions.

It is to be appreciated that one or more embodiments described herein are inherently and inextricably tied to computer technology and cannot be implemented outside of a hybrid classical/quantum computing environment. For example, one or more processes performed by one or more embodiments described herein can more efficiently provide these parameters as compared to current systems and/or techniques. Systems, computer-implemented methods and/or computer program products facilitating performance of these processes are of great utility in the field of quantum computation and cannot be equally practicably implemented in a sensible way outside of a computing environment.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 12:
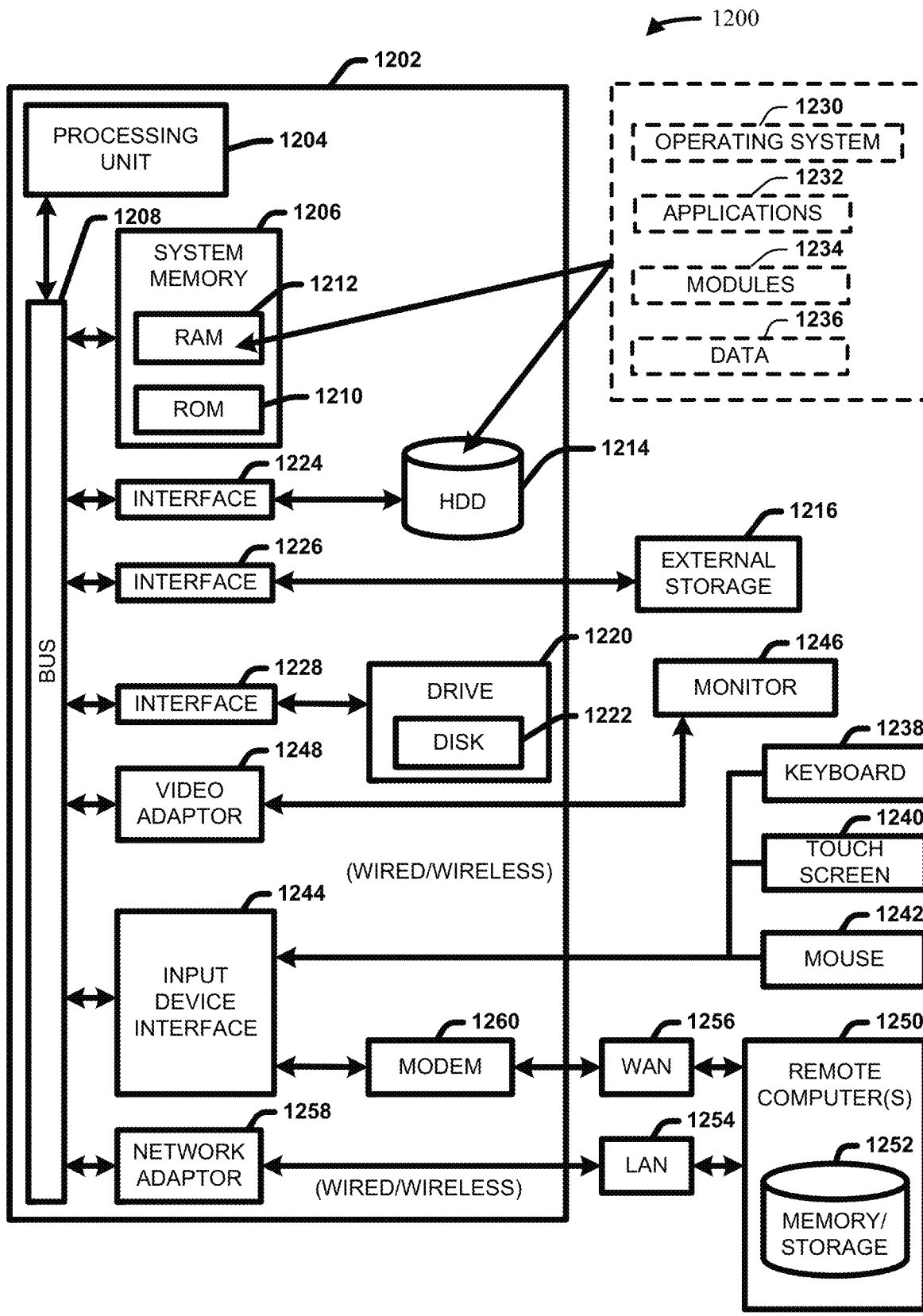
FIG. 12 illustrates a block diagram of an example, non-limiting operating environment in which one or more embodiments described herein can be facilitated.

In order to provide additional context for one or more embodiments described herein, FIG. 12 and the following discussion are intended to provide a brief, general description of a suitable operating environment 1200 in which the one or more embodiments described herein can be implemented. For example, one or more components and/or other aspects of embodiments described herein can be implemented in or be associated with the operating environment 1200. Further, while one or more embodiments have been described above in the general context of computer-executable instructions that can run on one or more computers, those skilled in the art will recognize that the embodiments also can be implemented in combination with other program modules and/or as a combination of hardware and software.

Generally, program modules include routines, programs, components, data structures and/or the like, that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 12, the example operating environment 1200 for implementing one or more embodiments of the aspects described herein can include a computer 1202, the computer 1202 including a processing unit 1204, a system memory 1206 and/or a system bus 1208. It will be appreciated that any aspect of the system memory 1206 or processing unit 1204 can be applied to memory 106 or processor 104, respectively of the non-limiting system 100 and/or can be implemented in combination and/or alternatively to memory 106 or processor 104, respectively.

Memory 1206 can store one or more computer and/or machine readable, writable and/or executable components and/or instructions that, when executed by processing unit 1204 (e.g., a classical processor, a quantum processor and/or like processor), can facilitate performance of operations defined by the executable component(s) and/or instruction(s). For example, memory 1206 can store computer and/or machine readable, writable and/or executable components and/or instructions that, when executed by processing unit 1204, can facilitate execution of the one or more functions described herein relating to non-limiting system 100 and/or unitary matrix implementation system 102, as described herein with or without reference to the one or more figures of the one or more embodiments.

Memory 1206 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 1204 can comprise one or more types of processors and/or electronic circuitry (e.g., a classical processor, a quantum processor and/or like processor) that can implement one or more computer and/or machine readable, writable and/or executable components and/or instructions that can be stored at memory 1206. For example, processing unit 1204 can perform one or more operations that can be specified by computer and/or machine readable, writable and/or executable components and/or instructions including, but not limited to, logic, control, input/output (I/O), arithmetic and/or the like. In one or more embodiments, processing unit 1204 can be any of one or more commercially available processors. In one or more embodiments, processing unit 1204 can comprise one or more central processing unit, multi-core processor, microprocessor, dual microprocessors, microcontroller, System on a Chip (SOC), array processor, vector processor, quantum processor and/or another type of processor. The examples of processing unit 1204 can be employed to implement any one or more embodiments described herein.

The system bus 1208 can couple system components including, but not limited to, the system memory 1206 to the processing unit 1204. The system bus 1208 can be any of several types of bus structure that can further interconnect to a memory bus (with or without a memory controller), a peripheral bus and/or a local bus using any of a variety of commercially available bus architectures. The system memory 1206 can include ROM 1210 and/or RAM 1212. A basic input/output system (BIOS) can be stored in a non-volatile memory such as ROM, erasable programmable read only memory (EPROM) and/or EEPROM, which BIOS contains the basic routines that help to transfer information among elements within the computer 1202, such as during startup. The RAM 1212 can include a high-speed RAM, such as static RAM for caching data.

The computer 1202 can include an internal hard disk drive (HDD) 1214 (e.g., EIDE, SATA), one or more external storage devices 1216 (e.g., a magnetic floppy disk drive (FDD), a memory stick or flash drive reader, a memory card reader and/or the like) and/or a drive 1220, e.g., such as a solid state drive or an optical disk drive, which can read or write from a disk 1222, such as a CD-ROM disc, a DVD, a BD and/or the like. Additionally and/or alternatively, where a solid state drive is involved, disk 1222 could not be included, unless separate. While the internal HDD 1214 is illustrated as located within the computer 1202, the internal HDD 1214 can also be configured for external use in a suitable chassis (not shown). Additionally, while not shown in operating environment 1200, a solid state drive (SSD) can be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The HDD interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1212, including an operating system 1230, one or more applications 1232, other program modules 1234 and/or program data 1236. All or portions of the operating system, applications, modules and/or data can also be cached in the RAM 1212. The systems and/or methods described herein can be implemented utilizing one or more commercially available operating systems and/or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In a related embodiment, operating system 1230 can comprise one virtual machine (VM) of multiple VMs hosted at computer 1202. Furthermore, operating system 1230 can provide runtime environments, such as the JAVA runtime environment or the .NET framework, for applications 1232. Runtime environments are consistent execution environments that can allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and/or settings for an application.

Further, computer 1202 can be enabled with a security module, such as a trusted processing module (TPM). For instance, with a TPM, boot components hash next in time boot components and wait for a match of results to secured values before loading a next boot component. This process can take place at any layer in the code execution stack of computer 1202, e.g., applied at application execution level and/or at operating system (OS) kernel level, thereby enabling security at any level of code execution.

An entity can enter and/or transmit commands and/or information into the computer 1202 through one or more wired/wireless input devices, e.g., a keyboard 1238, a touch screen 1240 and/or a pointing device, such as a mouse 1242. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface and/or the like.

A monitor 1246 or other type of display device can be alternatively and/or additionally connected to the system bus 1208 via an interface, such as a video adapter 1248. In addition to the monitor 1246, a computer typically includes other peripheral output devices (not shown), such as speakers, printers and/or the like.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device and/or other common network node, and typically includes many or all of the elements described relative to the computer 1202, although, for purposes of brevity, only a memory/storage device 1252 is illustrated. Additionally and/or alternatively, the computer 1202 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 1254 and/or larger networks, e.g., a wide area network (WAN) 1256. LAN and WAN networking environments can be commonplace in offices and companies and can facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired and/or wireless communication to the LAN 1254, which can also include a wireless access point (AP) disposed thereon for communicating with the adapter 1258 in a wireless mode.

When used in a WAN networking environment, the computer 1202 can include a modem 1260 and/or can be connected to a communications server on the WAN 1256 via other means for establishing communications over the WAN 1256, such as by way of the Internet. The modem 1260, which can be internal and/or external and a wired and/or wireless device, can be connected to the system bus 1208 via the input device interface 1244. In a networked environment, program modules depicted relative to the computer 1202 or portions thereof can be stored in the remote memory/storage device 1252. It will be appreciated that the network connections shown are merely exemplary and one or more other means of establishing a communications link among the computers can be used.

When used in either a LAN or WAN networking environment, the computer 1202 can access cloud storage systems or other network-based storage systems in addition to, and/or in place of, external storage devices 1216 as described above, such as but not limited to, a network virtual machine providing one or more aspects of storage and/or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, such as with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be practiced in distributed computing environments (e.g., cloud computing environments), such as described below with respect to FIG. 13, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1350 described below with reference to FIG. 13, and/or with reference to the one or more functional abstraction layers (e.g., quantum software and/or the like) described below with reference to FIG. 14, to execute one or more operations in accordance with one or more embodiments described herein. For example, cloud computing environment 1350 and/or one or more of the functional abstraction layers 1460, 1470, 1480 and/or 1490 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but can specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 1200 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 1200 can be employed to use hardware and/or software to solve problems that are highly technical in nature, that are not abstract and/or that cannot be performed as a set of mental acts by a human.

Figure 13:
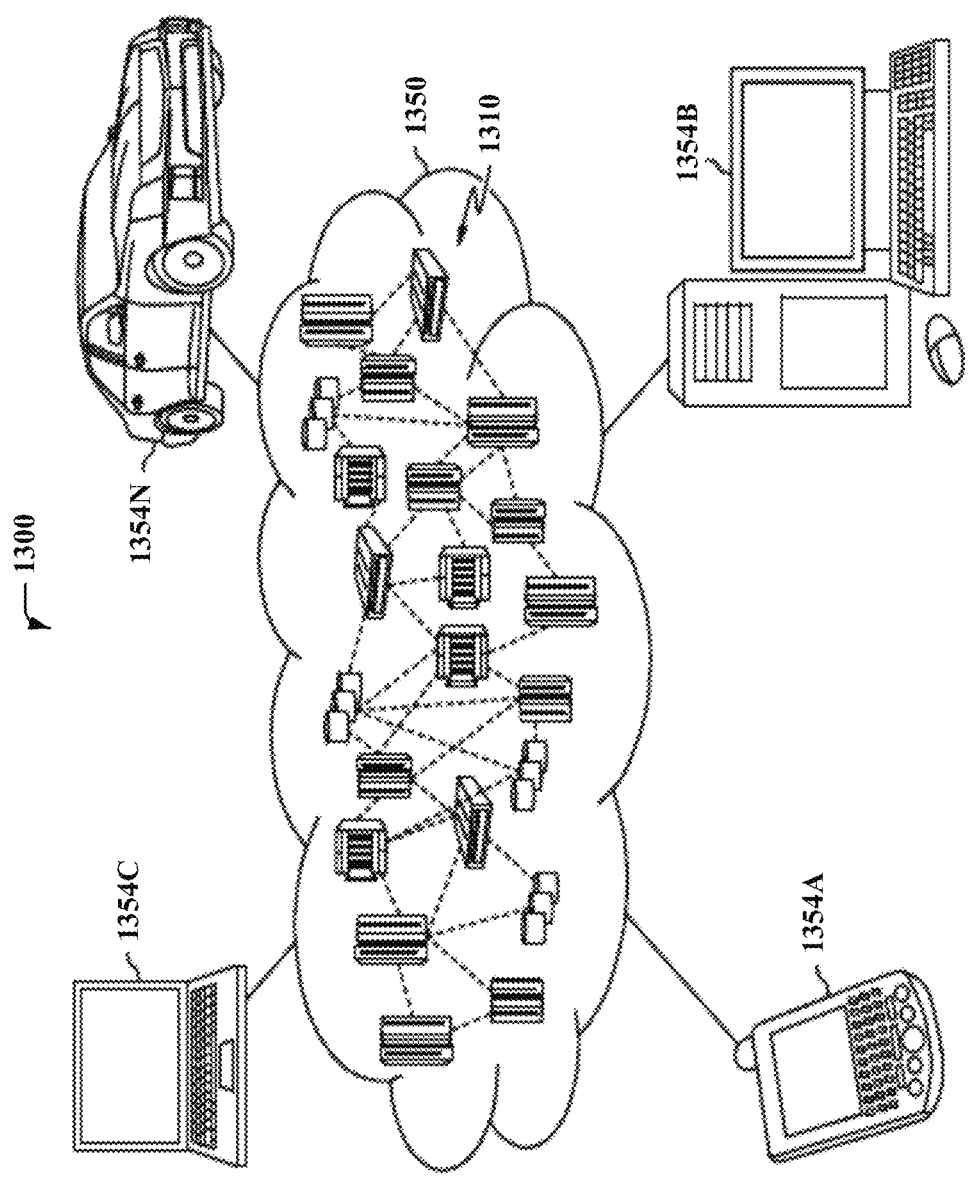
FIG. 13 illustrates a block diagram of an example, non-limiting cloud computing environment in accordance with one or more embodiments described herein.

Referring now to details of one or more aspects illustrated at FIG. 13, the illustrative cloud computing environment 1350 is depicted. As shown, cloud computing environment 1350 includes one or more cloud computing nodes 1310 with which local computing devices used by cloud consumers, such as, for example, personal digital assistant (PDA) or cellular telephone 1354A, desktop computer 1354B, laptop computer 1354C and/or automobile computer system 1354N can communicate. Although not illustrated in FIG. 13, cloud computing nodes 1310 can further comprise a quantum platform (e.g., quantum computer, quantum hardware, quantum software and/or the like) with which local computing devices used by cloud consumers can communicate. Cloud computing nodes 1310 can communicate with one another. They can be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that cloud computing nodes 1310 and cloud computing environment 1350 can communicate with any type of computerized device over any type of network and/or network addressable connection (e.g., using a web browser).

Figure 14:
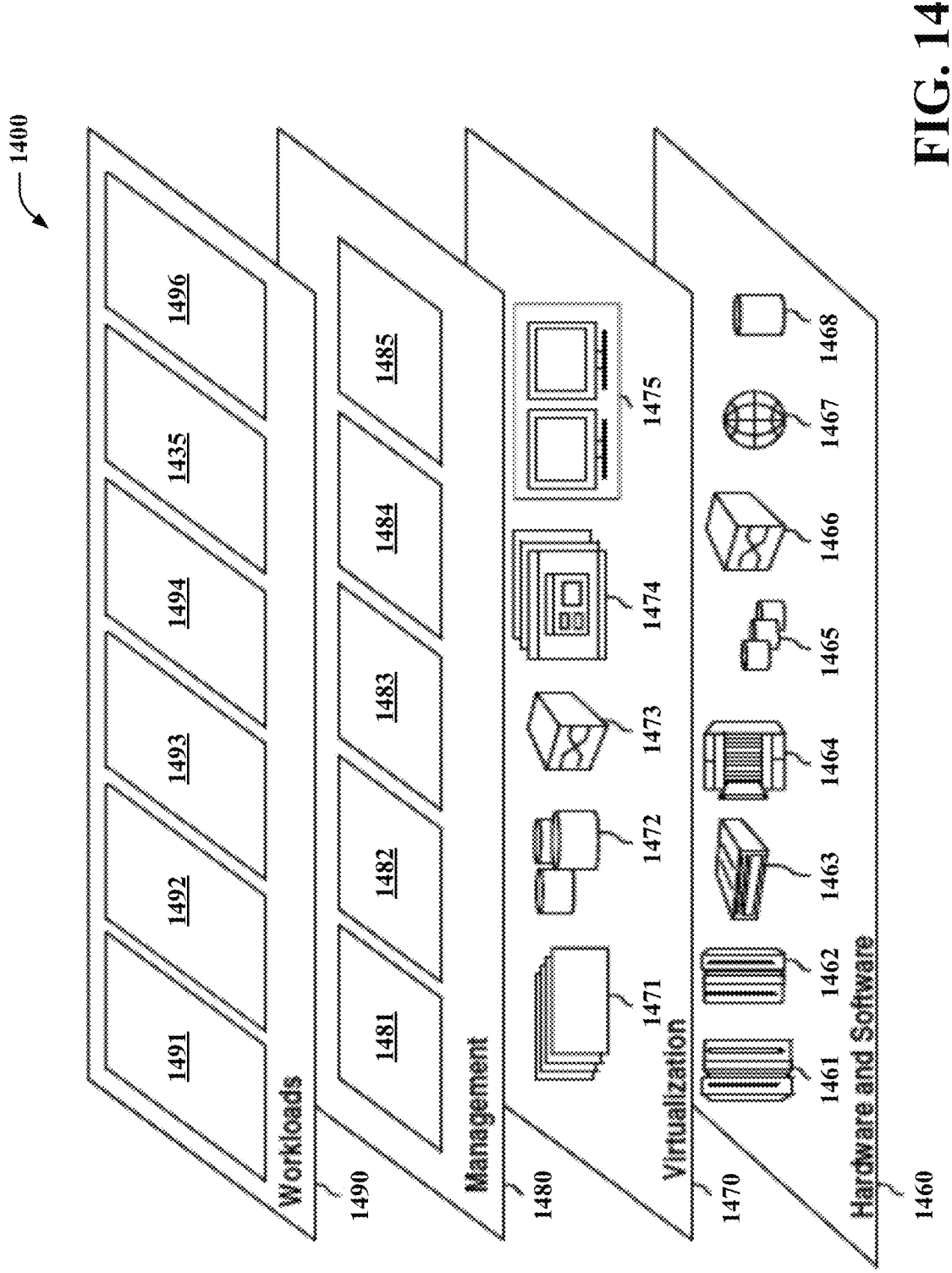
FIG. 14 illustrates a block diagram of a plurality of example, non-limiting abstraction model layers, in accordance with one or more embodiments described herein.

Referring now to details of one or more aspects illustrated at FIG. 14, a set of functional abstraction layers is shown, such as provided by cloud computing environment 1350 (FIG. 13). One or more embodiments described herein can be associated with one or more functional abstraction layers described below with reference to FIG. 14 (e.g., hardware and software layer 1460, virtualization layer 1470, management layer 1480 and/or workloads layer 1490). It should be understood in advance that the components, layers and/or functions shown in FIG. 14 are intended to be illustrative only and embodiments described herein are not limited thereto. As depicted, the following layers and/or corresponding functions are provided:

Hardware and software layer 1460 can include hardware and software components. Examples of hardware components include: mainframes 1461; RISC (Reduced Instruction Set Computer) architecture-based servers 1462; servers 1463; blade servers 1464; storage devices 1465; and/or networks and/or networking components 1466. In some embodiments, software components can include network application server software 1467, quantum platform routing software 1468; and/or quantum software (not illustrated in FIG. 14).

Virtualization layer 1470 can provide an abstraction layer from which the following examples of virtual entities can be provided: virtual servers 1471; virtual storage 1472; virtual networks 1473, including virtual private networks; virtual applications and/or operating systems 1474; and/or virtual clients 1475.

In one example, management layer 1480 can provide the functions described below. Resource provisioning 1481 can provide dynamic procurement of computing resources and other resources that can be utilized to perform tasks within the cloud computing environment. Metering and Pricing 1482 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1483 can provide access to the cloud computing environment for consumers and system administrators. Service level management 1484 can provide cloud computing resource allocation and/or management such that required service levels are met. Service Level Agreement (SLA) planning and fulfillment 1485 can provide pre-arrangement for, and procurement of, cloud computing resources for which a future requirement is anticipated in accordance with an SLA.

Workloads layer 1490 can provide examples of functionality for which the cloud computing environment can be utilized. Non-limiting examples of workloads and functions which can be provided from this layer include: mapping and navigation 1491; software development and lifecycle management 1492; virtual classroom education delivery 1493; data analytics processing 1494; transaction processing 1495; and/or application transformation software 1496.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules.

Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the native inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer executable components; and
   a processor that executes the computer executable components stored in the memory, wherein the computer executable components comprise:
      a unitary matrix management component that decomposes a defined 4×4 unitary matrix into a defined circuit comprising a sequence of universal gates,
      wherein the sequence of universal gates is a same sequence for each defined 4×4 unitary matrix of a set of candidate 4×4 unitary matrices including the defined 4×4 unitary matrix.

2. The system of claim 1, wherein the unitary matrix management component further provides the sequence of universal gates having a lowest pulse count decomposable from each defined 4×4 unitary matrix of the set of candidate 4×4 unitary matrices.

3. The system of claim 1, wherein the unitary matrix management component further provides the sequence of universal gates comprising one or more square root of X gate, echo cross resonance gate, phase gate or a combination thereof and omits other gate types from the sequence of universal gates.

4. The system of claim 1, wherein the unitary matrix management component further provides the sequence of universal gates comprising peripheral gates implementable via a larger quantity of physical operations at respective left and right peripheries of the sequence of universal gates as compared to central gates of the sequence of universal gates disposed between the peripheral gates.

5. The system of claim 1, wherein the unitary matrix management component further provides the sequence of universal gates being compatible with native 2-qubit gate directions of hardware on which the sequence of universal gates is to be implemented.

6. The system of claim 1, wherein the computer executable components further comprise:
   a swap component that implements a swap gate at each of left and right peripheries of the sequence of universal gates to provide a modified sequence of universal gates, and that vertically flips the modified sequence of universal gates to thereby provide the sequence of universal gates being compatible with native 2-qubit gate directions of hardware on which the modified sequence of universal gates is to be implemented.

7. The system of claim 1, in combination with a quantum system that implements the sequence of universal gates as a sequence of universal pulses on one or more qubits comprised by the quantum system.

8. A computer-implemented method, comprising:
   decomposing, by a system operatively coupled to a processor, a defined 4×4 unitary matrix into a defined circuit comprising a sequence of universal gates,
   wherein the sequence of universal gates is a same sequence for each defined 4×4 unitary matrix of a set of candidate 4×4 unitary matrices including the defined 4×4 unitary matrix.

9. The computer-implemented method of claim 8, further comprising:
   providing, by the system, the sequence of universal gates having a lowest pulse count decomposable from each defined 4×4 unitary matrix of the set of candidate 4×4 unitary matrices.

10. The computer-implemented method of claim 8, further comprising:
    providing, by the system, the sequence of universal gates comprising one or more square root of X gate, echo cross resonance gate, phase gate or a combination thereof and omitting other gate types from the sequence of universal gates.

11. The computer-implemented method of claim 8, further comprising:
    providing, by the system, the sequence of universal gates comprising peripheral gates implementable via a larger quantity of physical operations at respective left and right peripheries of the sequence of universal gates as compared to central gates of the sequence of universal gates disposed between the peripheral gates.

12. The computer-implemented method of claim 8, further comprising:
    providing, by the system, the sequence of universal gates being compatible with native 2-qubit gate directions of hardware on which the sequence of universal gates is to be implemented.

13. The computer-implemented method of claim 8, further comprising:
    implementing, by the system, a swap gate at each of left and right peripheries of the sequence of universal gates to provide a modified sequence of universal gates, and
    vertically flipping, by the system, the modified sequence of universal gates to thereby provide the sequence of universal gates being compatible with native 2-qubit gate directions of hardware on which the modified sequence of universal gates is to be implemented.

14. The computer-implemented method of claim 8, further comprising:
    implementing on a quantum system, by the system, the sequence of universal gates as a sequence of universal pulses on one or more qubits comprised by the quantum system.

15. A computer program product for facilitating decomposition of a unitary matrix, the computer program product comprising a computer readable storage medium having program instructions embodied therewith, the program instructions executable by a processor to cause the processor to:
    decompose, by the processor, a defined 4×4 unitary matrix into a defined circuit comprising a sequence of universal gates,
    wherein the sequence of universal gates is a same sequence for each defined 4×4 unitary matrix of a set of candidate 4>4 unitary matrices including the defined 4>4 unitary matrix.

16. The computer program product of claim 15, wherein the program instructions are further executable by the processor to cause the processor to:

provide, by the processor, the sequence of universal gates having a lowest pulse count decomposable from each defined 4×4 unitary matrix of the set of candidate 4×4 unitary matrices.

17. The computer program product of claim 15, wherein the program instructions are further executable by the processor to cause the processor to:
provide, by the processor, the sequence of universal gates comprising one or more square root of X gate, echo cross resonance gate, phase gate or a combination thereof and omitting other gate types from the sequence of universal gates.

18. The computer program product of claim 15, wherein the program instructions are further executable by the processor to cause the processor to:
provide, by the processor, the sequence of universal gates comprising peripheral gates implementable via a larger quantity of physical operations at respective left and right peripheries of the sequence of universal gates as compared to central gates of the sequence of universal gates disposed between the peripheral gates.

19. The computer program product of claim 15, wherein the program instructions are further executable by the processor to cause the processor to:
implement, by the processor, a swap gate at each of left and right peripheries of the sequence of universal gates to provide a modified sequence of universal gates, and
vertically flip, by the processor, the modified sequence of universal gates to thereby provide the sequence of universal gates being compatible with native 2-qubit gate directions of hardware on which the modified sequence of universal gates is to be implemented.

20. The computer program product of claim 15, further comprising a quantum processor that executes one or more quantum program instructions, wherein the quantum program instructions are executable by the quantum processor to cause the quantum processor to:
implement, by the quantum processor, the sequence of universal gates as a sequence of universal pulses on one or more qubits.

\* \* \* \* \*